US012241292B2

(12) United States Patent
Yu et al.

(10) Patent No.: US 12,241,292 B2
(45) Date of Patent: Mar. 4, 2025

(54) LOCK DEVICE OF A VEHICLE

(71) Applicant: Magna Automotive Parts (Suzhou) Co., Ltd., Suzhou (CN)

(72) Inventors: Jianjun Yu, Suzhou (CN); Jun Jin, Suzhou (CN)

(73) Assignee: Magna Automotive Parts (Suzhou) Co., Ltd., Suzhou (CN)

( * ) Notice: Subject to any disclaimer, the term of this patent is extended or adjusted under 35 U.S.C. 154(b) by 303 days.

(21) Appl. No.: 17/676,287

(22) Filed: Feb. 21, 2022

(65) Prior Publication Data

US 2022/0268067 A1 Aug. 25, 2022

(30) Foreign Application Priority Data

Feb. 23, 2021 (CN) ......................... 202110202859.0
Feb. 23, 2021 (CN) ......................... 202120400221.3
Feb. 23, 2021 (CN) ......................... 202120401086.4

(51) Int. Cl.

*E05B 85/26* (2014.01)
*E05B 79/20* (2014.01)
*E05B 81/06* (2014.01)
*E05B 81/14* (2014.01)
*E05B 81/16* (2014.01)
*E05B 81/20* (2014.01)
*E05B 83/18* (2014.01)

(Continued)

(52) U.S. Cl.

CPC .............. *E05B 85/26* (2013.01); *E05B 79/20* (2013.01); *E05B 81/06* (2013.01); *E05B 81/14* (2013.01); *E05B 81/16* (2013.01); *E05B 83/18* (2013.01); *E05B 83/243* (2013.01); *E05B 85/243* (2013.01); *E05B 81/20* (2013.01)

(58) Field of Classification Search

CPC ........ E05B 85/20; E05B 85/24; E05B 85/243; E05B 85/26; E05B 83/16; E05B 83/18; E05B 83/24; E05B 83/243; E05B 81/14; E05B 81/18; E05B 81/20

See application file for complete search history.

(56) References Cited

U.S. PATENT DOCUMENTS 4,872,714 A 10/1989 Brusasco
5,868,444 A * 2/1999 Brackmann ............. E05B 81/20 292/216

(Continued)

FOREIGN PATENT DOCUMENTS

DE 1553470 A1 * 8/1970
DE 19650826 A1 * 6/1998 ............. E05B 81/14

(Continued)

*Primary Examiner* — Alyson M Merlino

(74) *Attorney, Agent, or Firm* — Dickinson Wright PLLC

(57) ABSTRACT

A lock device of a vehicle comprising: a base plate; a guide plate rotatably disposed on the base plate; a pawl rotatably disposed on the base plate, the pawl being engageable with the guide plate in an unlocking position and disengageable from the guide plate between a half-locked and fully-locked position; a ratchet rotatably disposed on the base plate for retaining a striker when in the half-locked or the fully-locked position when the pawl is engaged with the ratchet; and a release member rotatably disposed on the base plate, the release member engagable with the guide plate; the release member is configured to drive the guide plate to engage with the pawl and drive the pawl to decouple from the ratchet.

16 Claims, 15 Drawing Sheets

(51) Int. Cl.

| | |
|---|---|
| ***E05B 83/24*** | (2014.01) |
| ***E05B 85/24*** | (2014.01) |

(56) References Cited

U.S. PATENT DOCUMENTS

| | | | | |
|---|---|---|---|---|
| 6,341,448 | B1 | 1/2002 | Murray et al. | |
| 6,848,727 | B1 | 2/2005 | Cetnar et al. | |
| 9,534,428 | B2 * | 1/2017 | Kim | E05B 83/24 |
| 9,874,046 | B2 * | 1/2018 | Wittelsbuerger | E05B 85/243 |
| 9,920,556 | B2 | 3/2018 | Byun et al. | |
| 11,591,832 | B2 * | 2/2023 | Kajigai | E05B 85/243 |
| 2016/0090759 | A1 * | 3/2016 | Rosales | E05B 85/26 292/200 |
| 2016/0168883 | A1 * | 6/2016 | Konchan | E05B 83/24 292/200 |
| 2016/0186468 | A1 | 6/2016 | Ilea | |
| 2017/0089103 | A1 | 3/2017 | Ottino et al. | |
| 2017/0089105 | A1 | 3/2017 | Margheritti | |
| 2017/0306661 | A1 * | 10/2017 | Kim | E05B 81/20 |
| 2018/0051494 | A1 | 2/2018 | Scocco | |
| 2018/0100331 | A1 | 4/2018 | Cumbo | |
| 2018/0171677 | A1 | 6/2018 | Im et al. | |
| 2022/0259898 | A1 * | 8/2022 | Graute | E05B 85/26 |

FOREIGN PATENT DOCUMENTS

| | | | | |
|---|---|---|---|---|
| DE | 19905774 | A1 * | 8/2000 | E05B 81/20 |
| DE | 10231825 | A1 * | 4/2004 | E05B 81/14 |
| DE | 102007008700 | A1 * | 8/2008 | E05B 83/16 |
| DE | 102014003737 | A1 | 9/2015 | |
| DE | 10231825 | B4 | 8/2016 | |
| WO | 2003071064 | A1 | 8/2003 | |
| WO | 2008104073 | A1 | 9/2008 | |
| WO | 2011015497 | A1 | 2/2011 | |

* cited by examiner

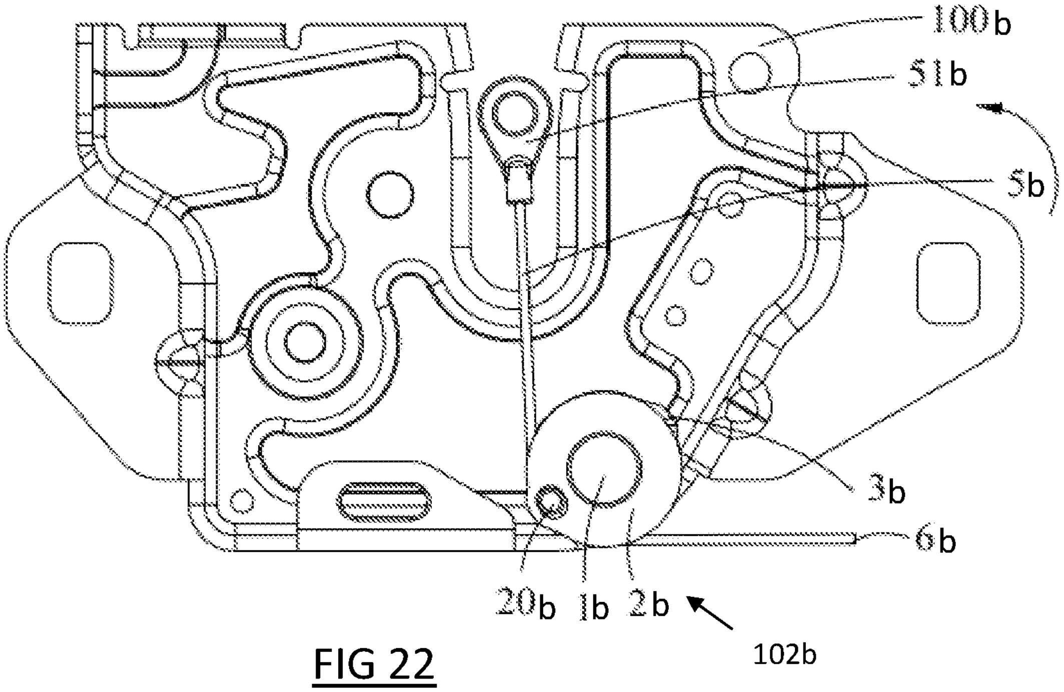
FIG 22
FIG 23
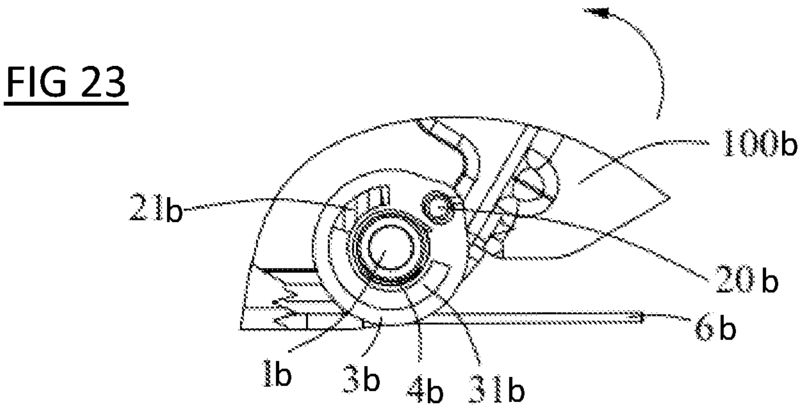

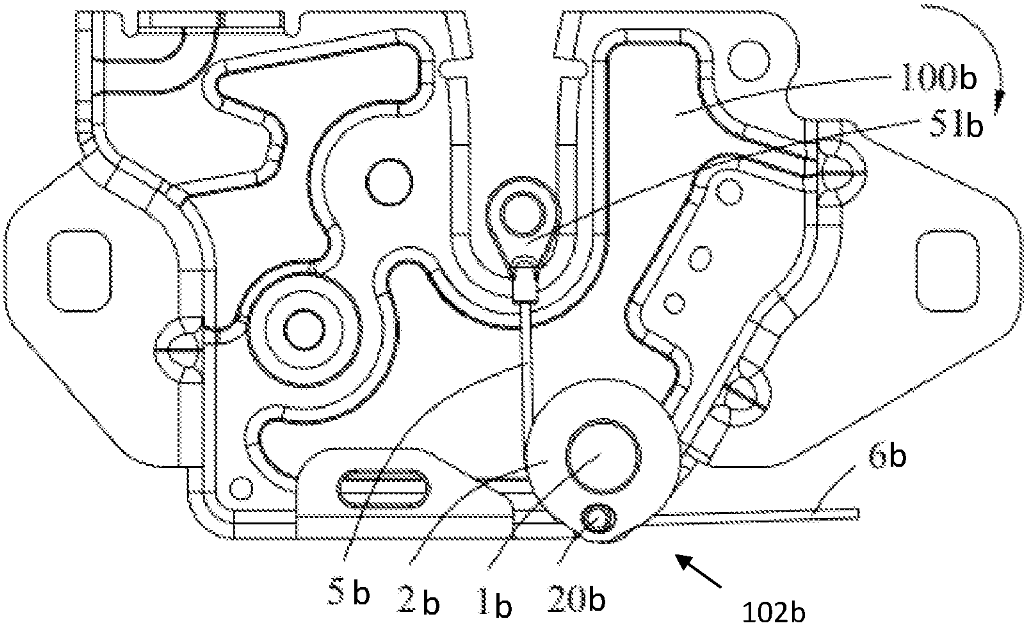
FIG 26
FIG 27
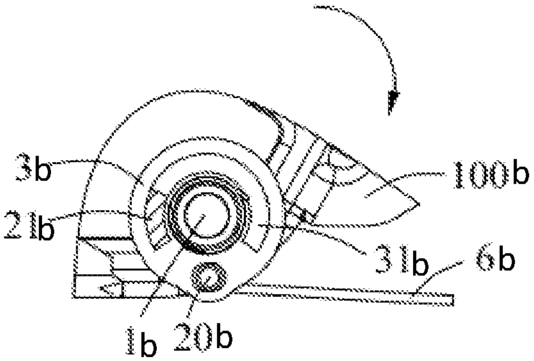

LOCK DEVICE OF A VEHICLE

CROSS REFERENCE TO RELATED APPLICATIONS

This application claims the benefit of Chinese Patent Application No. CN 202120400221.3, filed on Feb. 23, 2021, Chinese Patent Application No. CN 202120401086.4, filed on Feb. 23, 2021, and Chinese Patent Application No. CN 202110202859.0, filed on Feb. 23, 2021, the contents of which are incorporated herein by reference in their entirety.

TECHNICAL FIELD

The present invention relates to the technical field of vehicle parts, and particularly to a lock device and a vehicle.

BACKGROUND

A vehicle lock device is a device which is installed in an engine compartment or luggage compartment of a vehicle and can reliably lock a compartment cover of the engine compartment or luggage compartment.

In current lock design, a lock device implements automatic locking between a ratchet of the lock device and a striker of a vehicle compartment cover through a control system, thereby realizing automatic locking of the lock device. Conventional lock devices generally have an unlocking position, a half-locked position and a full-locked position. The ratchet and pawl of the lock device can be rotated from the unlocking position to the half-locked position separately to achieve first stage locking of the lock device. In the half-locked position, the ratchet and the pawl are coupled, and the control system drives, by a motor, the ratchet and the pawl to rotate synchronously to the full-locked position, so that the ratchet and the striker are completely locked to achieve a secondary locking of the lock device. The half locked position can be referred to as a secondary locking state and the full locked position can be referred to as a primary locked state.

A disadvantage with current lock design is when a sudden situation occurs in the lock device during the process of secondary locking. For example, the output power can be interrupted due to the power failure or failure of the motor, or a foreign object is presented between the compartment cover and the compartment. In this circumstance, the process of secondary locking of the lock device can be interrupted and therefore compartment cover cannot be quickly reset or locked. This interruption can cause deadlock of the compartment cover, resulting in a low reliability of the lock device.

For manual type lock devices, at present, the lock device generally has a two-stage locking function, which requires two steps to unlock. In a first step, a first stage lock of the lock device is opened through a button in a cab, to facilitate the lock device to rotate from a full-locked position to a half-locked position; and in a second step, a driver and conductor or an operator reaches into a compartment of a compartment cover at a front end of the vehicle by hand and releases a handle to open a second stage lock. When subsequently closing the compartment cover, it is necessary to manually push down on the compartment cover with effort to realize safe locking of the lock device, due to the forces of gravity and the manual manipulation of the compartment cover.

The subsequent relocking operation of a conventional lock device can require a relatively large force, which can be problematic as this is dependent upon the physical strength of the operator, which is inconvenient to the user's experience. At the same time, multiple times of locking of the compartment cover is apt to damage the structural parts of the lock device, thereby reducing the service life of the lock device.

At present, the lock device with an automatic locking function generally has an unlocking position, a half-locked position and a full-locked position. The lock device includes a ratchet wheel, a ratchet pawl, a motor and a pull-cable wheel unit. The motor pulls, through a pull cable on the pull-cable wheel unit, the ratchet pawl to rotate, to allow the ratchet pawl to be coupled with the ratchet wheel during rotation and rotate synchronously with the ratchet wheel to the full-locked position so as to lock the compartment cover of the vehicle. After the compartment cover is locked, an output shaft of the motor is rotated in a reverse direction and reset, resulting in loose of the pull cable. However, disadvantageously, when the lock device locks again, in an initial stage of starting of the motor, the output shaft rotates in a forward direction for a certain time to re-tension the pull cable, and then pulls the ratchet pawl to rotate, which increases the time for locking of the lock device and reduces the working efficiency of the lock device.

SUMMARY

One object of the present invention is to provide a lock device to obviate or mitigate at least one of the above-presented disadvantages.

One object of the present invention is to provide a lock device to realize automatic locking of the lock device, save the user's physical strength and improve the service life of the lock device.

One object of the present utility model is to provide a pull-cable wheel unit to reduce the time for locking of a lock device and improve the locking efficiency.

One aspect provided is a pull-cable wheel unit, mounted between a pawl and a drive member on a base plate mounted on a body of a vehicle, the pawl having an unlocking position, a half-locked position and a full-locked position, the pull-cable wheel unit comprises: a positioning post; a cable wheel and a return wheel, each of the cable wheel and the return wheel rotatably mounted on the positioning post, the cable wheel configured to be wound with a first pull cable connected to the pawl, and the return wheel configured to be wound with a second pull cable connected to an output end of the drive member; and an elastic member, positioned between the cable wheel and the return wheel, the elastic member configured to bias the return wheel to rotate by a preset angle when the pawl is in the full-locked position to facilitate a portion of the second pull cable to be wound on the return wheel.

A second aspect provided is a lock device of a vehicle comprising: a base plate; a guide plate rotatably disposed on the base plate; a pawl rotatably disposed on the base plate, the pawl being engageable with the guide plate in an unlocking position and disengageable from the guide plate between a half-locked and fully-locked position; a ratchet rotatably disposed on the base plate for retaining a striker when in the half-locked or the fully-locked position when the pawl is engaged with the ratchet; and a release member rotatably disposed on the base plate, the release member engagable with the guide plate; the release member is configured to drive the guide plate to engage with the pawl and drive the pawl to decouple from the ratchet.

A lock device includes a base plate, a guide plate, a pawl assembly, a ratchet and a release member. A lock device includes a baseplate, a guide plate, a pawl assembly, a ratchet and a drive mechanism. The guide plate is disposed on the base plate. Further, the base plate is provided with a slot, and the latch is slidably disposed in the slot.

The pawl assembly comprises a pawl, a return member and a rivet post, where the rivet post is rotatably disposed on the base plate, and the pawl is rotatably disposed on the rivet post through the return member.

The ratchet is rotatably disposed on the base plate, the ratchet includes a locking slot or groove fitted with a striker of a vehicle compartment cover, the ratchet has an unlocking position, a half-locked position and a full-locked position in sequence in a forward rotation direction, and when the ratchet is located in the unlocking position, the pawl is engaged with the guide plate, and the striker presses against the locking slot, to facilitate the ratchet to be supported on the rivet post.

Further, in the half-locked position, the pawl is disengaged from the guide plate and rotates around the rivet post in the forward direction, to facilitate the pawl and the ratchet to be coupled with each other and rotate synchronously to the full-locked position, thereby providing the locking slot to be locked and fitted with the striker.

The release member is rotatably disposed on the base plate, and the release member is engaged and fitted with the guide plate; the release member is configured to be capable of rotating a reverse direction after the pawl and the ratchet are coupled with each other and driving the guide plate to rotate in the forward direction, and the guide plate is engaged with the pawl to drive the pawl to rotate in the reverse direction, to facilitate the pawl to be decoupled from the ratchet.

The drive mechanism has an output end connected to the rivet post and is configured to, when triggered, drive the pawl to rotate in the forward direction through the rivet post, so as to facilitate the ratchet to rotate in the forward direction from the unlocking position to the half-locked position; the pawl is disengaged from the guide plate in the half-locked position and rotates around the rivet post to be coupled with the ratchet so as to drive the ratchet to rotate synchronously to the full-locked position, enabling the locking groove to be locked and fitted with the latch.

Further, the lock device further includes a ratchet spring, one end of the ratchet spring is fixedly disposed on the base plate, and another end of the ratchet spring is located below the rivet post and abuts against the rivet post, to facilitate the ratchet to have a tendency to rotate in the reverse direction.

Further, the pawl assembly further includes a spring-back member, the spring-back member includes a connecting plate and a supporting plate which are connected to each other, one end of the connecting plate is rotatably disposed on the base plate, another end of the connecting plate is sleeved on the rivet post, and the supporting plate is configured to support the ratchet.

Further, one of the release member and the guide plate is provided with an engaging slot, the other one of the release member and the guide plate is provided with a release column, and the engaging slot is engaged and fitted with the release column.

Further, the release member is coupled via a restoring member with a positioning column, the positioning column is disposed on the base plate, and both the release member and the restoring member are sleeved on the positioning column, one end of the restoring member is fixedly disposed, and another end of the restoring member abuts against the release member, to facilitate the release member to have a tendency to rotate in the forward direction.

Further, the lock device further includes a ratchet torsion spring, one end of the ratchet torsion spring is fixedly disposed on the base plate, and another end of the ratchet torsion spring is located under the rivet post and abuts against the rivet post, to facilitate the ratchet to have a tendency to rotate in the reverse direction.

Further, the lock device further includes a drive mechanism, the drive mechanism has an output end connected to the rivet post, and the drive mechanism is configured to be capable of driving the pawl to rotate from the unlocking position to the full-locked position through the rivet post when the drive mechanism is triggered.

Further, the lock device further includes a first switch disposed on the base plate, the ratchet further includes a pressing part, and the first switch is electrically connected to the drive mechanism; and when the ratchet is in the unlocking position, the pressing part presses against the first switch so that the drive mechanism is turned off; and when the ratchet comes out of the unlocking position, the pressing part is released from pressing against the first switch to trigger the drive mechanism.

Further, the guide plate has a first outer edge, the pawl has a flange, and the flange is capable of slidably pressing against the first outer edge.

Further, the guide plate has a first outer edge, the pawl has a flange, and when the ratchet is located between the unlocking position and the half-locked position, the flange slidingly presses against the first outer edge.

Further, the guide plate further has a second outer edge connected to the first outer edge, and the second outer edge is recessed inwardly to form an avoidance groove for making way for the pawl.

Further, the pawl has an engaging part, and the ratchet has a limiting slot, and the pawl is configured to be capable of rotating around the rivet post in the forward direction, to facilitate the engaging part to be engaged with the limiting slot; or when the release member rotates in the reverse direction, the pawl rotates around the rivet post in the forward direction, to facilitate the engaging part to be disengaged from the limiting slot.

Further, the pawl has an engaging part, and the ratchet has a limiting groove, and when the pawl rotates around the rivet post, the engaging part comes into engagement with the limiting groove.

Further, the pawl has a hitching part, the return member is sleeved on the rivet post, one end of the return member is fixedly disposed on the rivet post, and another end of the return member abuts against the hitching part, to facilitate the pawl to have a tendency to rotate in the forward direction.

Another object of the present invention is to provide a vehicle, to address the issue of deadlock of the compartment cover after the process of secondary locking of the lock device is interrupted, and improve reliability of the lock device.

One advantage of the improved device includes: between the half-locked position and the full-locked position, the release member rotates in the reverse direction to drive the guide plate to rotate in the forward direction, the guide plate comes into engagement with the pawl and drives the pawl to rotate in the reverse direction, thereby decoupling the pawl from the ratchet, thereby inhibiting the deadlock of the compartment cover when the lock device rotates from the half-locked position to the full-locked position, which can improve the reliability of the lock device.

Another advantage of the improved device includes: when the ratchet is in the unlocking position, the pawl is engaged with the guide plate, and the drive mechanism, after being triggered, drives the pawl to rotate in the forward direction to the half-locked position, so that the pawl and the ratchet are coupled together; and the drive mechanism continues to drive the pawl and the ratchet to rotate to the full-locked position synchronously, thus realizing the locking and fitting between the ratchet and the latch. The lock device is locked simply by triggering the drive mechanism, which is easy to operate and does not need to press or cast the compartment cover with a large force, saves the user's physical strength and improves the user's experience. Moreover, the damage to the structural parts of the lock device is reduced and the service life of the lock device is prolonged.

A pull-cable wheel unit is provided, which is mounted between a ratchet pawl and a drive member of a lock device. The ratchet pawl has an unlocking position, a half-locked position and a full-locked position, and the pull-cable wheel unit includes: a positioning post, a cable wheel and a return wheel, and an elastic member. The positioning post is fixedly arranged.

Each of the cable wheel and the return wheel is rotatably sleeved on the positioning post, the cable wheel is wound with a first pull cable, the first pull cable is connected to the ratchet pawl, the return wheel is wound with a second pull cable, and the second pull cable is connected to an output end of the drive member.

The elastic member has one end abutting against the cable wheel, and the other end abutting against the return wheel. The elastic member is configured to be capable of driving the return wheel to rotate by a preset angle in a reverse direction when the lock device is in the full-locked position to allow part of the second pull cable to be wound on the return wheel.

Further, one of the cable wheel and the return wheel has a sliding groove extending in a circumferential direction of the positioning post, the other of the cable wheel and the return wheel is provided with a sliding block adapted to the sliding groove, and the sliding block is slidingly disposed in the sliding groove.

Further, the sliding groove is an arc-shaped groove, and the sliding groove has a central angle of $\alpha$, and $180° < \alpha < 360°$.

Further, the return wheel is provided with an annular groove, and the elastic member is mounted in the annular groove.

Further, the return wheel has, in its axial direction, a first end facing the cable wheel and a second end facing away from the cable wheel, the second end is provided with a projection, and the annular groove extends from the first end into the projection.

Further, a circumferential outer edge of each of the cable wheel and the return wheel is recessed inwardly to form a cable winding groove, at least part of the first pull cable is wound on the cable winding groove of the cable wheel, and at least part of the second pull cable is wound on the cable winding groove of the return wheel.

Further, the cable wheel and the return wheel are each provided with a lock post, one end of the first pull cable is fixedly connected to the lock post of the cable wheel, the other end of the first pull cable is connected to the ratchet pawl, one end of the second pull cable are fixedly connected to the lock post of the return wheel, and the other end of the second pull cable is connected to the output end of the drive member.

Further, one end of the first pull cable connected to the ratchet pawl is provided with a collar, and the collar is connected to the ratchet pawl.

Another object of the present invention is to provide a lock device to reduce the time for locking of the lock device and improve the locking efficiency.

A lock device includes a base plate, a ratchet, a pawl, a drive member and the above-described pull-cable wheel unit. The ratchet and the pawl are each rotatably disposed on the base plate, the positioning post of the pull-cable wheel unit is fixedly arranged on the base plate, and the drive member is drivingly connected to the pawl through the pull-cable wheel unit.

Another object of the present invention is to provide a vehicle to reduce the time for locking of the lock device and improve the locking efficiency.

According to the pull-cable wheel unit, the lock device and the vehicle, when the drive member pulls the second pull cable on the return wheel, the cable wheel and the return wheel rotate in the forward direction, so that the lock device reaches the full-locked position and is locked. When the drive member is reset, the second pull cable is turned loose, and the return wheel is rotated in the reverse direction around the positioning post under the action of the restoring force of the elastic member, so that part of the second pull cable is rewound on the return wheel to keep tension of the second pull cable. When the lock device locks again, it is unnecessary to re-tension the second pull cable, which is conducive to reducing the time for locking of the lock device and improving the locking efficiency.

The lock device has a return member and a rivet post, wherein the rivet post is rotatably disposed on the base plate, and the pawl is rotatably disposed on the rivet post through the return member; the ratchet rotatably disposed on the base plate, the ratchet comprising a locking slot for receiving the striker of a vehicle compartment cover, the ratchet having the unlocking position, the half-locked position and the full-locked position in sequence in a forward rotation direction, and when the ratchet is located in the unlocking position, the pawl is engaged with the guide plate, and the striker presses against the locking slot to facilitate the ratchet to be supported on the rivet post; and when the ratchet is located in the half-locked position, the pawl is disengaged from the guide plate and rotates around the rivet post in a forward direction, to facilitate the pawl and the ratchet to be coupled with each other and rotate synchronously to the full-locked position, enabling the locking slot to be locked and fitted with the striker; and The release member configured to rotate in a reverse direction after the pawl and the ratchet are coupled with each other and drive the guide plate to rotate in the forward direction, so that the guide plate comes into engagement with the pawl and drives the pawl to rotate in the reverse direction, enabling the pawl to implement said decouple from the ratchet.

The lock device, wherein one of the release member and the guide plate is provided with an engaging slot, the other one of the release member and the guide plate is provided with a release column, and the engaging slot is engaged and fitted with the release column.

The lock device, wherein the release member is biased by a restoring member in relation to a positioning column, the positioning column is disposed on the base plate and both the release member and the restoring member are sleeved on the positioning column, one end of the restoring member is fixedly disposed, and another end of the restoring member abuts against the release member, to facilitate the release member to have a tendency to rotate in the forward direction.

The lock device, wherein the lock device further comprises a ratchet torsion spring, one end of the ratchet torsion spring is fixedly disposed on the base plate, and another end of the ratchet torsion spring is located under the rivet post and abuts against the rivet post, to facilitate the ratchet to have a tendency to rotate in the reverse direction.

The lock device, wherein the lock device further comprises a drive mechanism, the drive mechanism has an output end connected to the rivet post, and the drive mechanism is configured to be capable of driving the pawl to rotate from the unlocking position to the full-locked position through the rivet post when the drive mechanism is triggered.

The lock device further comprising a first switch disposed on the base plate, wherein the ratchet further comprises a pressing part, and the first switch is electrically connected to the drive mechanism; and when the ratchet is in the unlocking position, the pressing part presses against the first switch so that the drive mechanism is turned off; and when the ratchet comes out of the unlocking position, the pressing part is released from pressing against the first switch to trigger the drive mechanism.

The lock device, wherein the guide plate has a first outer edge, the pawl has a flange, and the flange is capable of slidably pressing against the first outer edge.

The lock device, wherein the guide plate further has a second outer edge connected to the first outer edge, and the second outer edge is recessed inwardly to form an avoidance groove for making way for the pawl.

The lock device, wherein the pawl has an engaging part, the ratchet has a limiting slot, and the pawl is configured to be capable of rotating around the rivet post in the forward direction to facilitate the engaging part to be engaged with the limiting slot; or when the release member rotates in the reverse direction, the pawl rotates around the rivet post in the forward direction, to facilitate the engaging part to be disengaged from the limiting slot.

BRIEF DESCRIPTION OF DRAWINGS

FIG. 22 is a schematic structure view of the pull-cable wheel unit and the base plate in a pre-tensioned state of FIG. 17;

FIG. 23 is a partial sectional view of FIG. 22;

FIG. 26 is a schematic structure view of the pull-cable wheel unit and the base plate in a returned state of FIG. 17; and FIG. 27 is a partial sectional view of FIG. 26.

DETAILED DESCRIPTION

Figure 1:
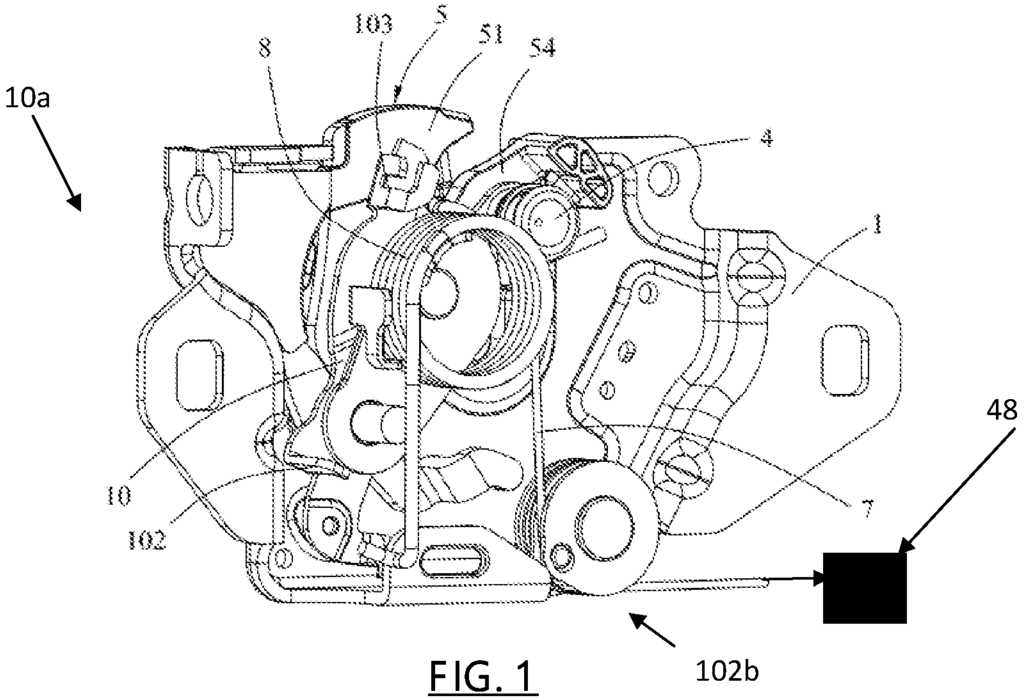
FIG. 1 is a schematic structure view of a lock device for a vehicle of FIGS. 15 and 16.

To make the technical issues to be addressed, the technical solutions adopted and the technical effects achieved more clear, the technical solutions are further described hereinafter through embodiments in conjunction with drawings. It is to be understood that the embodiments set forth below are intended to illustrate rather than limiting.

In the description, unless otherwise expressly specified and limited, the terms "connected to each other", "connected", or "fixed" are to be construed in a broad sense, for example, as permanently connected, detachably connected, or integrated; mechanically connected or electrically connected; directly connected to each other or indirectly connected to each other via an intermediary; or internally connection of two components or interaction between two components. For those of ordinary skill in the art, specific meanings of the preceding terms in the present utility model may be construed based on specific situations.

Unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of this embodiment, the orientation or positional relationships indicated by terms "above", "below", "right" and the like are based on the orientation or positional relationships shown in the drawings, merely for ease of description and simplifying operation, rather than indicating or implying that the referred device or element must have a specific orientation and is constructed and operated in a specific orientation, and thus they are not to be construed as limiting the present utility model. In addition, the terms "first" and "second" are used only to distinguish between descriptions and have no special meaning.

Figure 15:
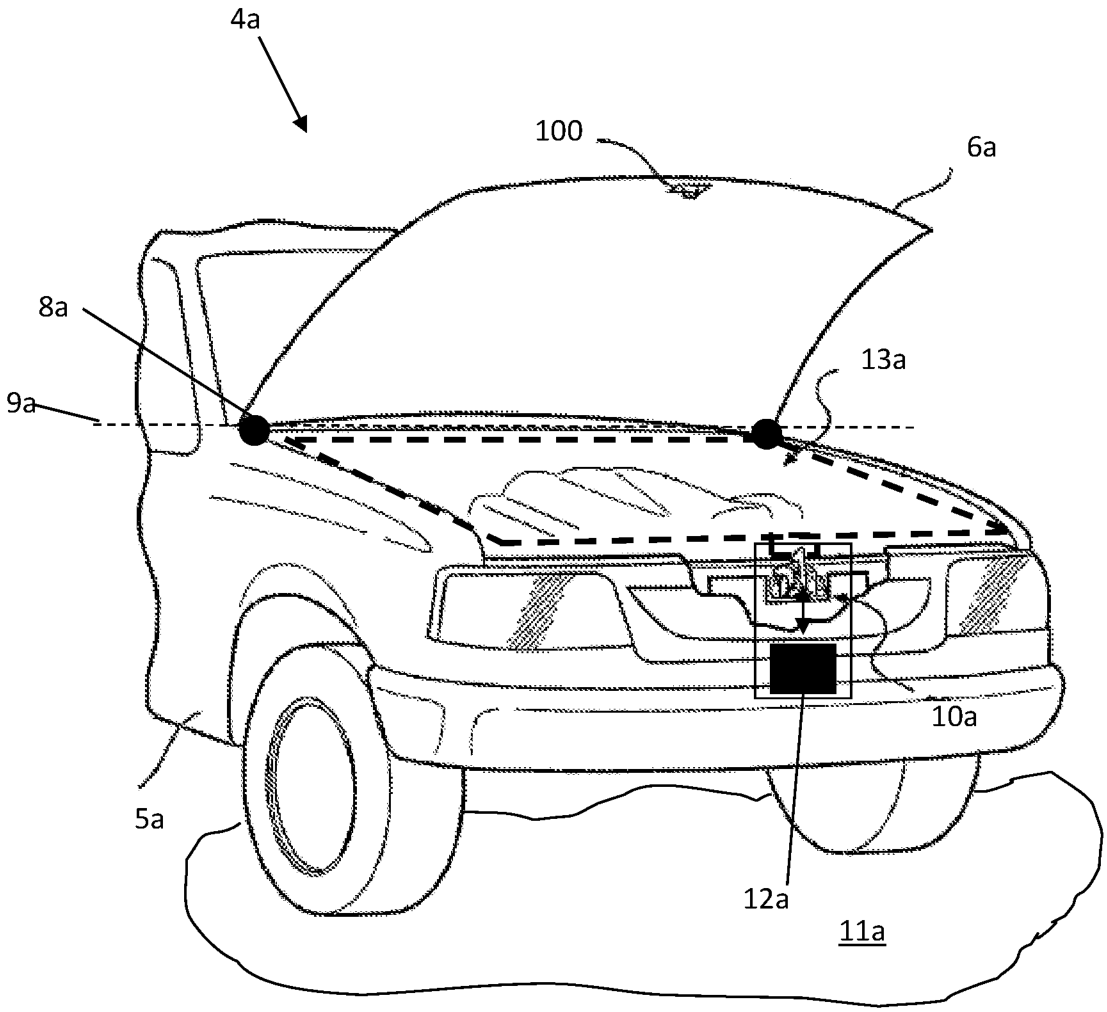
FIGS. 15 and 16 show example embodiments of vehicles having the lock device.

Referring to FIG. 15, shown is a vehicle 4*a* with a vehicle body 5*a* having one or more closure panels 6*a* coupled to the vehicle body 5*a*. The closure panel 6*a* is connected to the vehicle body 5*a* via one or more hinges 8*a* and a latch 10*a* (e.g. for retaining the closure panel 6*a* in a closed position once closed—such as a cinch latched primary position) (shown in dashed outline). The closure panel 6*a* has a mating latch component 100 (e.g. striker) mounted thereon for coupling with the latch 10*a* mounted on the vehicle body 5*a*. Alternatively, latch 10*a* can be mounted on the closure panel 6*a* and the mating latch component 100 mounted on the body 5*a* (not shown). For example, the latch 10*a* can have a ratchet 5 (see FIG. 2) for retaining the striker 100 between a striker releasing position corresponding to an open position of the closure panel 6*a* and a secondary striker capture position corresponding to a partially closed position (e.g. secondary position) of the closure panel 6*a*. Further, the ratchet 5 can be configured for having a primary striker capture position corresponding to a fully closed position of the closure panel 6*a* (e.g. a latched or primary position).

Figure 16:
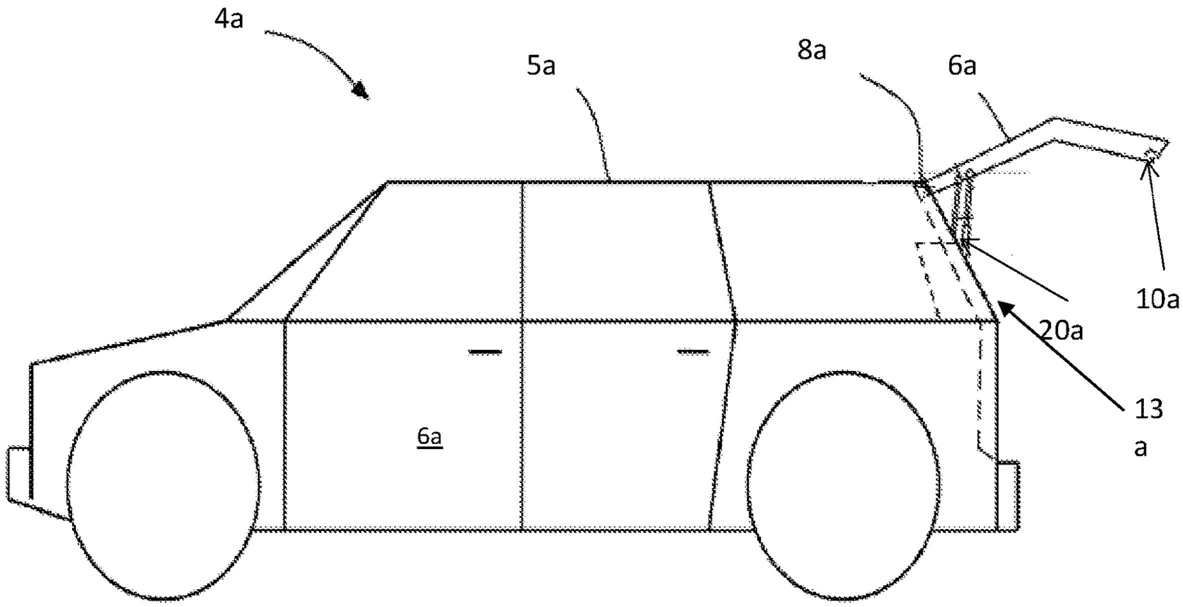

Referring to FIG. 16, shown is the vehicle 4*a* with the vehicle body 5*a* having an alternative embodiment of the one or more closure panels 6*a* coupled to the vehicle body 5*a*, including one or more struts 20*a* (e.g. power actuated struts 20*a*). The closure panel 6*a* is connected to the vehicle body 5*a* via one or more hinges 8*a* and latch 10*a* (e.g. for retaining the closure panel 6*a* in a closed position once closed). It is recognized that examples of the closure panel 6*a* can include a hood panel, a door panel, a hatch panel and other panels as desired.

In the embodiment shown, the closure panel 6*a* pivots between the open panel position and the closed panel position about a pivot axis 9*a* (e.g. of the hinge 8*a*), which can be configured as horizontal or otherwise parallel to a support surface 11*a* of the vehicle 4*a*. In other embodiments, the pivot axis 9*a* may have some other orientation such as vertical or otherwise extending at an angle outwards from the support surface 11*a* of the vehicle 4*a*. In still other embodiments, the closure panel 6*a* may move in a manner other than pivoting, for example, the closure panel 6*a* may translate along a predefined track or may undergo a combination of translation and rotation between the open and closed panel positions, such that the hinge 8*a* includes both pivot and translational components (not shown). As can be appreciated, the closure panel 6*a* can be embodied, for example, as a hood, passenger door, or lift gate (otherwise referred to as a hatch) of the vehicle 4*a*.

For vehicles 4*a* in general, the closure panel 6*a* can be referred to as a partition or door, typically hinged, but sometimes attached by other mechanisms such as tracks, in front of an opening 13*a* which can be used for entering and exiting the vehicle 4*a* interior by people and/or cargo. It is also recognized that the closure panel 6*a* can be used as an access panel for vehicle 4*a* systems such as engine compartments and also for traditional trunk compartments of automotive type vehicles 4*a*. The closure panel 6*a* can be opened to provide access to opening, or closed to secure or otherwise restrict access to the opening 13*a*. It is also recognized that there can be one or more intermediate open positions (e.g. unlatched position) of the closure panel 6*a* between a fully open panel position (e.g. unlatched position) and fully closed panel position (e.g. latched position), as provided at least in part by the hinges 8*a* and latch 10*a*, as assisted by the power latch system 12*a*. For example, the power latch system 12*a* can be used to provide an opening force (or torque) and/or a closing force (or torque) for the closure panel 6*a*.

Movement of the closure panel 6*a* (e.g. between the open and closed panel positions) can be electronically and/or manually operated, where power assisted closure panels 6*a* can be found on minivans, high-end cars, or sport utility vehicles (SUVs) and the like. As such, it is recognized that movement of the closure panel 6*a* can be manual or power assisted during operation of the closure panel 6*a* at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6*a* can also include a secondary lock (e.g. closure panel 6*a* has a primary lock configuration at fully closed and a secondary lock configuration at partially open—for example for latches 10*a* associated with vehicle hoods).

In terms of vehicles 4*a*, the closure panel 6*a* may be a hood, a lift gate, or it may be some other kind of closure panel 6*a*, such as an upward-swinging vehicle door (i.e. what is sometimes referred to as a gull-wing door) or a conventional type of door that is hinged at a front-facing or back-facing edge of the door, and so facilitates the door to swing (or slide) away from (or towards) the opening 13*a* in the body 5*a* of the vehicle 4*a*. Also contemplated are sliding door embodiments of the closure panel 6*a* and canopy door embodiments of the closure panel 6*a*, such that sliding doors can be a type of door that open by sliding horizontally or vertically, whereby the door is either mounted on, or suspended from a track that provides for a larger opening 13*a* for equipment to be loaded and unloaded through the opening 13*a* without obstructing access. Canopy doors are a type of door that sits on top of the vehicle 4 and lifts up in some way, to provide access for vehicle passengers via the opening 13*a* (e.g. car canopy, aircraft canopy, etc.). Canopy doors can be connected (e.g. hinged at a defined pivot axis and/or connected for travel along a track) to the body 5*a* of the vehicle at the front, side or back of the door, as the application permits. It is recognized that the body 5*a* can be represented as a body panel of the vehicle 4*a*, a frame of the vehicle 4*a*, and/or a combination frame and body panel assembly, as desired.

The vehicle 4*a* is disclosed in these embodiments. The vehicle 4*a* includes an engine compartment 13*a* or a luggage compartment 13*a*, a compartment cover 6*a* (as referred to as a closure panel) and a lock device 10*a*, e.g. a latch 10*a*. The compartment cover 6*a* can be provided with a striker 100, the lock device 10*a* is installed in the engine compartment 13*a* or the luggage compartment 13*a*, and the compartment cover 6*a* can be locked reliably by locking the striker 100 via the ratchet 5 (see FIG. 4).

For ease of description, the forward direction in these embodiments is the direction indicated by the arrows in FIG.

Figure 6:
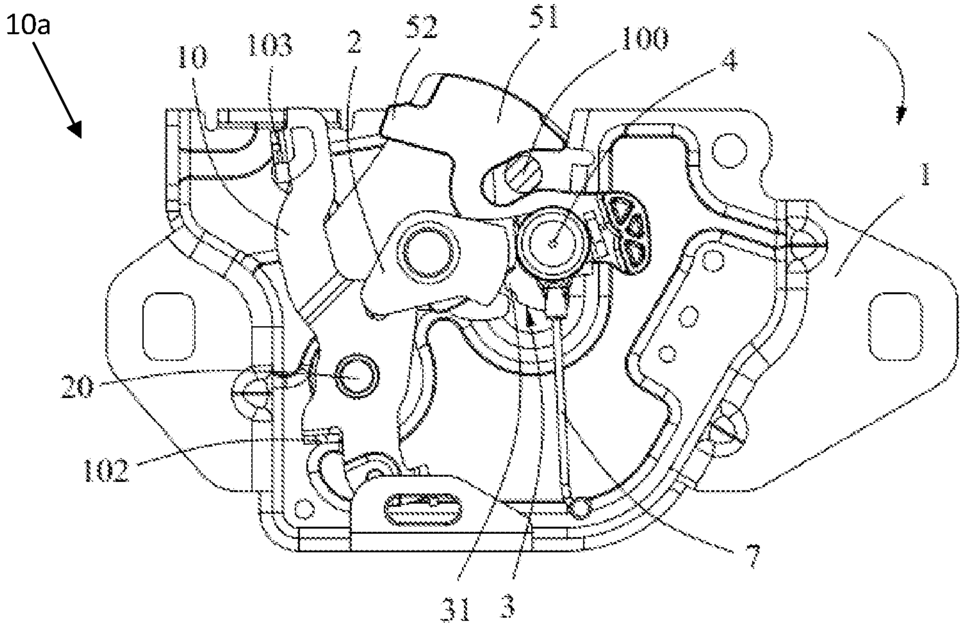
FIG. 6 is an end view of the lock device of FIG. 5 in an unlocking state with the ratchet torsion spring removed.

2 to FIG. 6 (i.e., clockwise direction), and the reverse direction is a direction opposite to the forward direction (i.e., counterclockwise direction).

Figure 8:
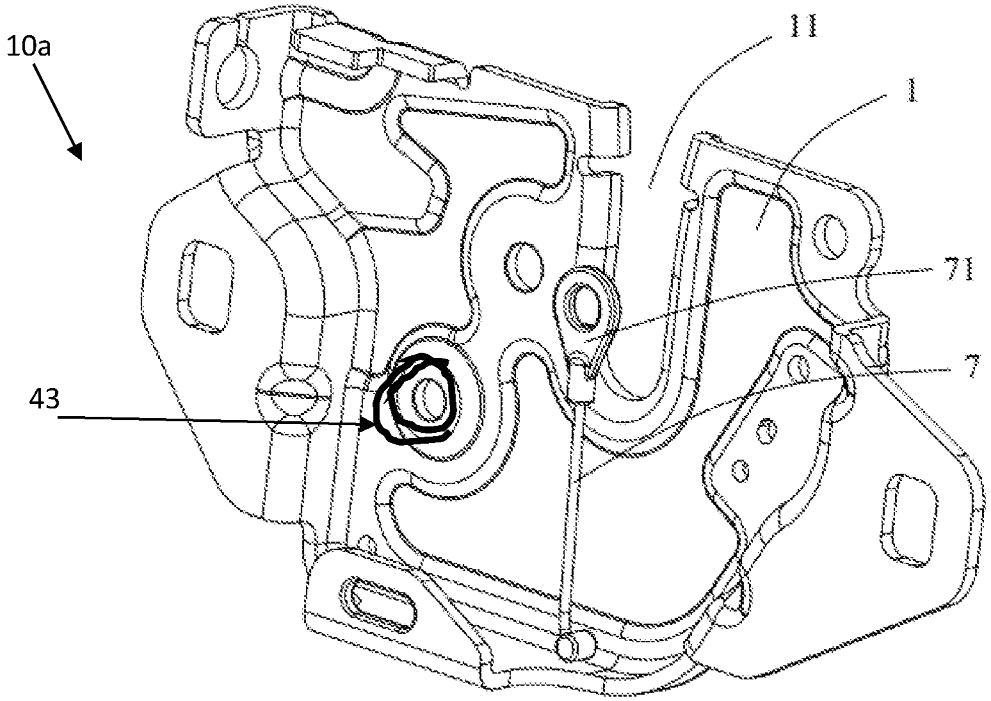
FIG. 8 is a schematic structure view of a base plate and a pull cable of the device of FIG. 1.

As shown in FIG. 1 to FIG. 4, a lock device 10*a* includes a base plate 1, a guide plate 2, a pawl assembly, a drive mechanism 42, and a ratchet 5 with biasing element (e.g. spring) 8. The base plate 1 can be fixedly installed on a front cross beam of the body 5. As shown in FIG. 8, the base plate 1 can be a sheet metal part, the base plate 1 is provided with a slot 11 (to accommodate the striker 100), and the striker 100 is slidably disposed in the slot 11. The slot 11 extends (e.g. in a vertical direction) and has an opening at a top end. The striker 100 is disposed in the slot 11 and can be inserted in a locking slot 511 of the ratchet 5 to realize locking of the compartment cover 6*a* via the latch 10*a*.

Specifically, the guide plate 2 is disposed on the base plate 1, the pawl assembly includes a pawl 3, a return member (e.g. biasing element such as a spring—see FIG. 11) 9 and a rivet post 4 (e.g. pivot of the pawl 3), the rivet post 4 is rotatably disposed on the base plate 1, and the pawl 3 is rotatably disposed on the rivet post 4 through the return member 9. The ratchet 5 is rotatably disposed on the base plate 1 on a pivot 40. The ratchet 5 includes the locking slot 511 fitted with the striker 100. The ratchet 5 has an unlocking position, a half-locked position and a full-locked position in sequence in the forward rotation direction. When the ratchet 5 is in the unlocking position, the pawl 3 is engaged with the guide plate 2, and the striker 100 presses against the locking slot 511 to facilitate the ratchet 5 to be supported on the rivet post 4.

An output end of the drive mechanism 42 (see FIG. 11, such as a motor shaft, a driven gear, etc.) is connected/coupled to the rivet post 4. When the drive mechanism 42 is triggered (e.g. as operated by a controller—not shown), the drive mechanism 42 can drive the pawl 3 (mounted on the rivet post 4) via the rivet post 4 to rotate R in the forward direction so as to drive the rivet post 4 to rotate in the forward direction to the half-locked position. The ratchet 5 rotates from the unlocking position to the half-locked position with the striker 100 against the gravity of the compartment cover 6*a* due to the bias of the biasing element 8.

In the half-locked position, the pawl 3 is disengaged from the guide plate 2 and rotates around the rivet post 4, to facilitate the pawl 3 to be coupled (e.g. engaged with one another via a notch and abutment—not shown) to the ratchet 5 and rotate synchronously with the ratchet 5 to the full-locked position, so that the locking slot 511 is locked and fitted with the striker 100 to realize self-locking of the compartment cover 6*a*.

In this embodiment, when the drive mechanism 42 is triggered to drive the rivet post 4 and the pawl 3 to rotate from the unlocking position to the half-locked position, the ratchet 5 rotates in the forward direction to the half-locked position under the pressing of the striker 100, the pawl 3 is disengaged from the guide plate 2, and the pawl 3 rotates in the forward direction around the rivet post 4 under an action of a return force of the return member 9, and is coupled/engaged with the ratchet 5. The drive mechanism 42 continues to drive the pawl 3 and the ratchet 5 to move synchronously to the full-locked position, so as to realize the locking and fitting between the ratchet 5 and the striker 100 (in the slot 151).

In other alternative embodiments, the pawl 3 can also rotate in the reverse direction, as long as the pawl 3 and the ratchet 5 can be coupled in the half-locked position.

For example, when the rotation of the pawl 3 and the ratchet 5 from the half-locked position to the full-locked position is interrupted unexpectedly, the ratchet 5 and the pawl 3 are coupled and can be deadlocked, resulting in that the compartment cover 6*a* may not be quickly reset or locked and the compartment cover is deadlocked, which reduces the reliability of the lock device.

Figure 5:
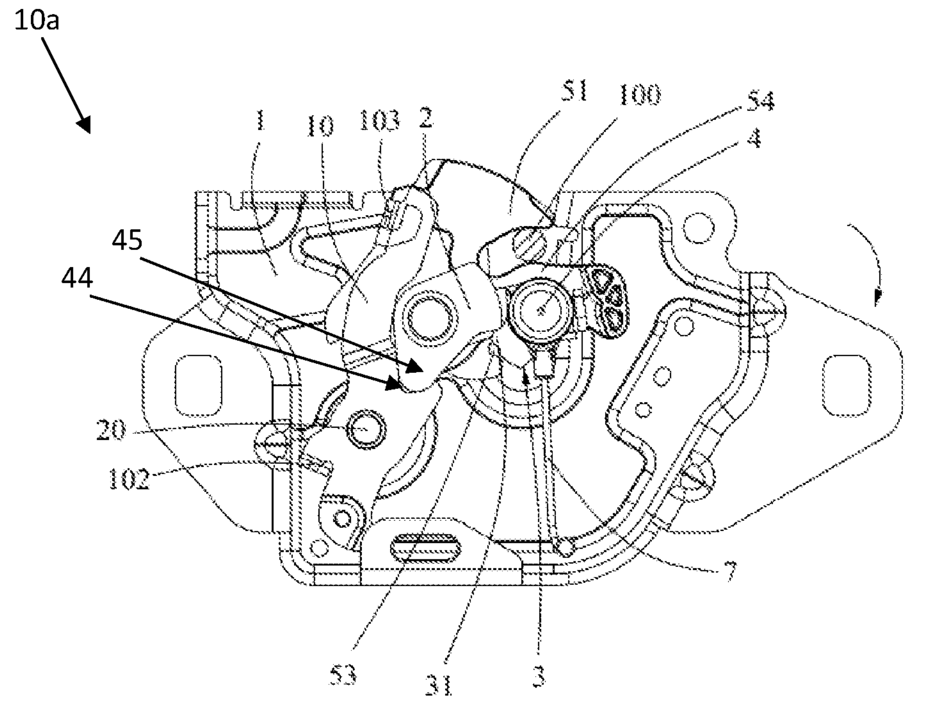
FIG. 5 is an end view of a further embodiment of the lock device of FIG. 1 in a deadlock state with the ratchet torsion spring removed.

In order to help address the above issue, as shown in FIG. 5 and FIG. 6, the lock device 10*a* in this further embodiment further includes a release member 10, where the release member 10 is rotatably disposed on the base plate 1 via a pivot 20 (e.g. position column 20), and the release member 10 is engaged and fitted with the guide plate 2 (e.g. via a notch 44 of the member 10 and abutment 45 of the guide plate 2). After the pawl 3 is coupled to the ratchet 5, the release member 10 rotates in the reverse direction and drives the guide plate 2 to rotate in the forward direction, so that the guide plate 2 comes into engagement with the pawl 3 and drives the pawl 3 to rotate in the reverse direction to be thus decoupled (i.e. disengaged) from the ratchet 5.

The release member 10 in this embodiment rotates in the reverse direction to drive the guide plate 2 to rotate in the forward direction. The guide plate 2 engages with the pawl 3 and drives the pawl 3 to rotate in the reverse direction, thereby decoupling the pawl 3 from the ratchet 5 and inhibiting deadlock of the compartment cover 6*a* in the process of rotating of the lock device 10*a* from the half-locked position to the full-locked position, which can improve the reliability of the lock device 10*a*.

Specifically, the release member 10 can be biased via the restoring member 43 on the positioning column 20 (e.g. pivot 20). The positioning column 20 is disposed on the base plate 1, and both the release member 10 and the restoring member 43 (see FIG. 8) are sleeved on the positioning column 20. One end of the restoring member 43 is fixedly disposed on the base plate 1, and another end of the restoring member 43 abuts against the release member 10, to facilitate the release member 10 to have a tendency to rotate (i.e. biased) in the forward direction.

The restoring member 43 in this embodiment can be a torsion spring. The release member 10 can have an irregular outer edge, and can be generally an elongated plate which is obliquely disposed. An upper end of the release member 10 has a pulling part 103, and a bottom end of the release member 10 has a mounting part 102. One end of the restoring member 43 is fixedly disposed on the base plate 1, and another end of the restoring member 43 abuts against the mounting part 102 (for positioning on the pivot 20). In addition, the guide plate 2 and the ratchet 5 are both rotatably sleeved on a pivot 40 of the base plate 1.

In a case where the compartment cover 6*a* is not deadlocked, the release member 10 abuts against a limiting rod (e.g. an abutment positioned on the mounting plate 1) under the action of the restoring force of the torsion spring 43, so as to keep the guide plate 2 stationary. The pulling part 103 can be drivingly coupled to a drive member 47 (e.g. cable) in the vehicle 4*a*. When deadlock of the compartment cover 6*a* occurs, the drive member 47 drives, through the pulling part 103, the release member 10 to rotate in the reverse direction around the positioning column 20, so as to facilitate the guide plate 2 to rotate in the forward direction.

Figure 7:
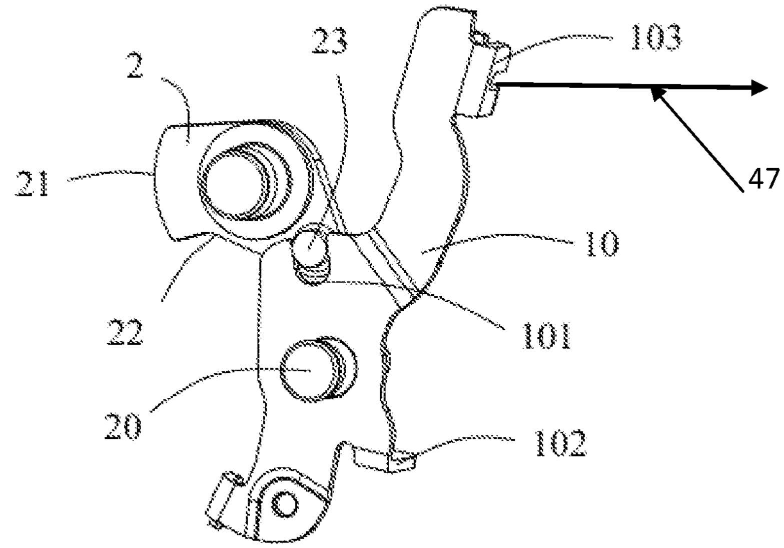
FIG. 7 is a schematic view showing an assembled structure of a guide plate and a release member of the device of FIG. 5.

As shown in FIG. 7, in a further embodiment, one of the release member 10 and the guide plate 2 is provided with an engaging slot 101, the other of the release member 10 and the guide plate 2 is provided with a release column/pin 23, so that the release column 23 can be engaged and fitted with the engaging slot 101. In this embodiment, the guide plate 2 is provided with the release column 23 on a side facing the base plate 1, a middle part of the release member 10 is provided with the engaging slot 101, and the engaging slot 101 has an opening at an outer edge of the release member 10 so as to be engaged and fitted with the release column 23. Alternatively the method of engagement between the guiding plate 2 and the release member 10 can be the notch 44 and abutment 45 shown in FIG. 5.

In an alternative embodiment, the release member 10 is provided with the release column 23, and the guide plate 2 has the engaging slot 101.

As shown in FIG. 1, the lock device 10*a* further includes a ratchet torsion spring 8, one end of the ratchet torsion spring 8 is fixedly disposed on the base plate 1, and another end of the ratchet torsion spring 8 is located under the rivet post 4 and abuts against the rivet post 4, to facilitate the ratchet 5 to have a tendency/bias to rotate in the reverse direction.

In in this embodiment, a mounting plate (not shown) is fixedly disposed on the base plate 1, the mounting plate is located above the guide plate 2, the ratchet torsion spring 8 is sleeved on the mounting plate, and the ratchet torsion spring 8 provides a restoring/biasing force to the ratchet 5 through the rivet post 4 to drive the ratchet 5 to rotate in the reverse direction to the unlocking position. Specifically, the striker 100 presses against the ratchet 5 under the gravity of the compartment cover 6*a*, and clamps the ratchet 5 together with the striker 100 and the rivet post 4, so that the ratchet 5 is firmly in the unlocking position.

The lock device 10*a* can further include the drive mechanism 48, an output end of the drive mechanism 48 is connected to the rivet post 4, and when triggered, the drive mechanism 48 can drive the pawl 3 to rotate from the unlocking position to the full locked position through the rivet post 4.

Specifically, the drive mechanism 48 drives the pawl 3 to rotate in the forward direction with respect to the base plate 1, to cause the rivet post 4 to get out of contact with the ratchet 5, thereby facilitating the ratchet 5 to rotate from the unlocking position to the half-locked position. The pawl 3 is disengaged from the guide plate 2 in the half-locked position (i.e. the notch 44 and abutment 45 are disengaged, for example). The pawl 3 rotates around the rivet post 4 to be coupled with the ratchet 5, and the drive mechanism 43 continues to drive the pawl 3 and the ratchet 5 to move synchronously to the full-locked position, so as to realize the locking and fitting between the locking slot 511 and the striker 100.

The lock device 10*a* can be automatically locked by triggering the drive mechanism 48, which is easy to operate and does not need to press or cast the compartment cover 6*a* with a large force, thus saving the user's physical strength and improving the user's experience. Moreover, the damage to the structural parts of the lock device 10*a* can be reduced and prolonging the service life of the lock device 10*a* can be facilitated.

The drive mechanism 48 in this embodiment can include a motor connected to a pull cable 7. The output end of the motor is connected to the pull cable 7, and the pull cable 7 is connected to the rivet post 4. The motor pulls the pull cable 7 to contract against the restoring force of the ratchet torsion spring 8, thereby driving the pawl 3 to rotate in the forward direction.

Figure 2:
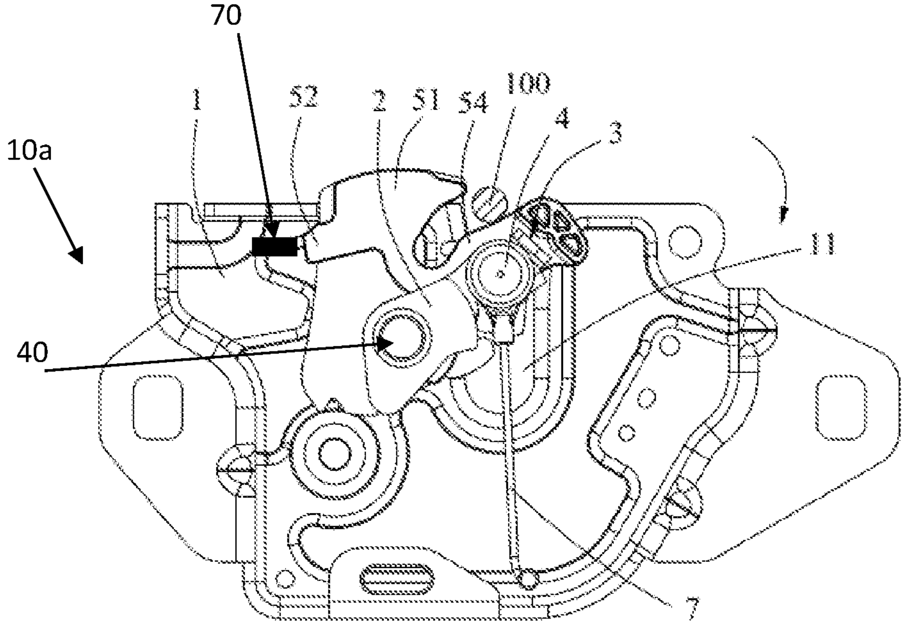
FIG. 2 is an end view of the lock device of FIG. 1 in an unlocking position with a ratchet torsion spring and a release member removed.
Figure 3:
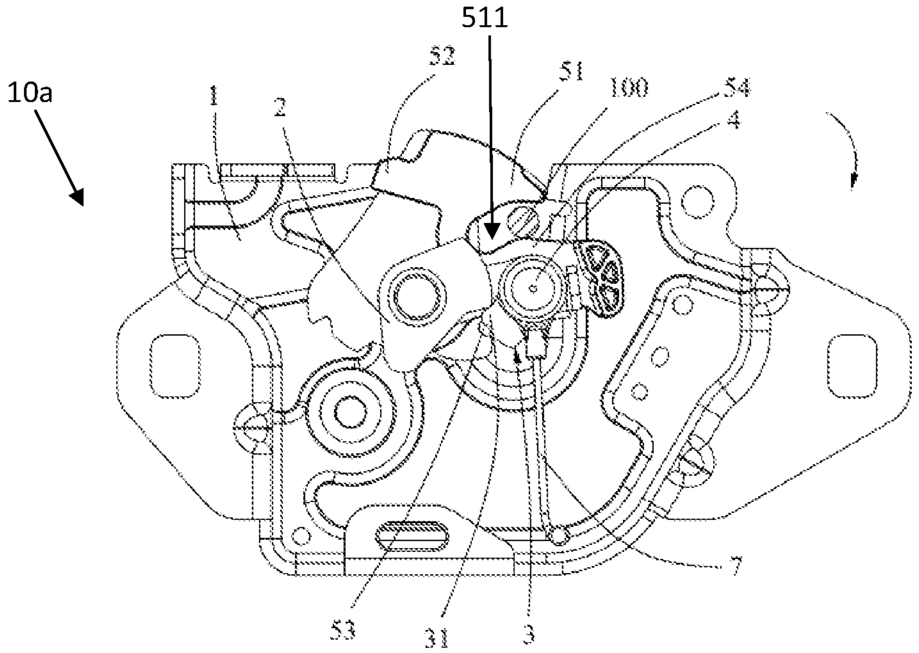
FIG. 3 is an end view of the lock device of FIG. 1 in a half-locked position with the ratchet torsion spring and the release member removed.
Figure 4:
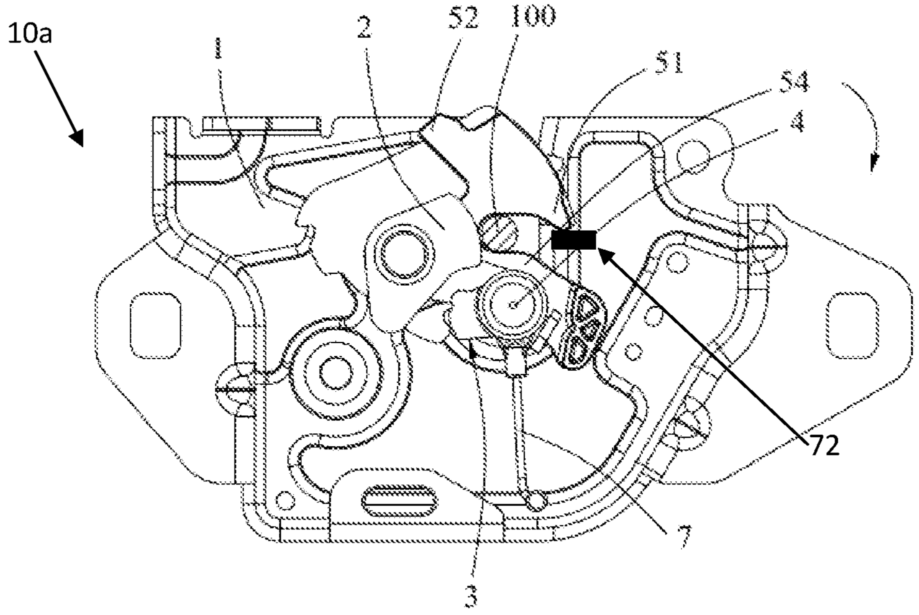
FIG. 4 is an end view of the lock device of FIG. 1 in a full-locked position with the ratchet torsion spring and the release member removed.

As shown in FIG. 2 to FIG. 4, the guide plate 2 and the ratchet 5 are coaxially disposed on the base plate 1. When the ratchet 5 rotates from the unlocking position to the full-locked position, the guide plate 2 is fixed relative to the base plate 1, the drive mechanism 48 drives the pawl 3 to rotate in the forward direction relative to the base plate 1, and the pawl 3 is engaged with the guide plate 2, so that the guide plate 2 can limit the pawl 3 to prevent the pawl 3 from rotating around the rivet post 4 in the forward direction.

Figure 9:
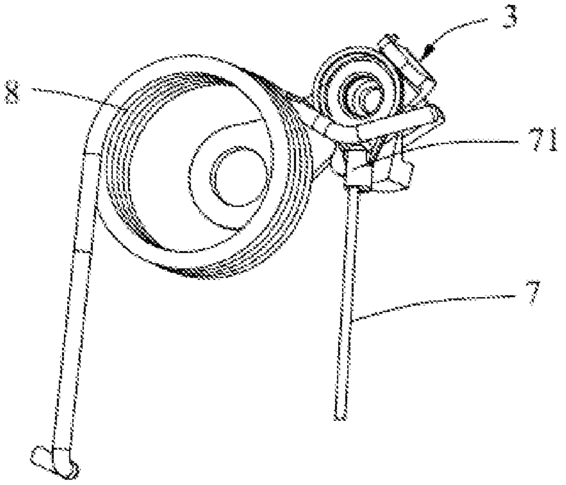
FIG. 9 is a schematic structure view of the ratchet torsion spring and a pawl assembly with a rivet post removed from a first perspective of the device of FIG. 1.
Figure 10:
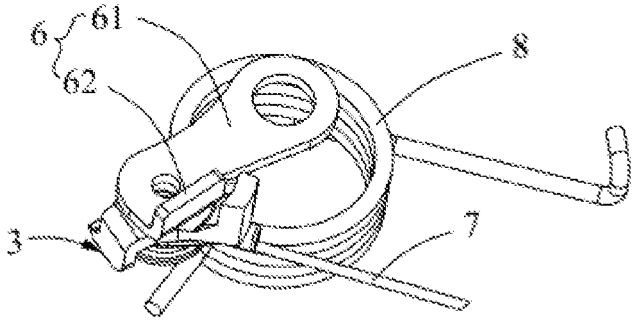
FIG. 10 is a schematic structure view of the ratchet torsion spring and the pawl assembly with the rivet post removed from a second perspective of the device of FIG. 1.
Figure 11:
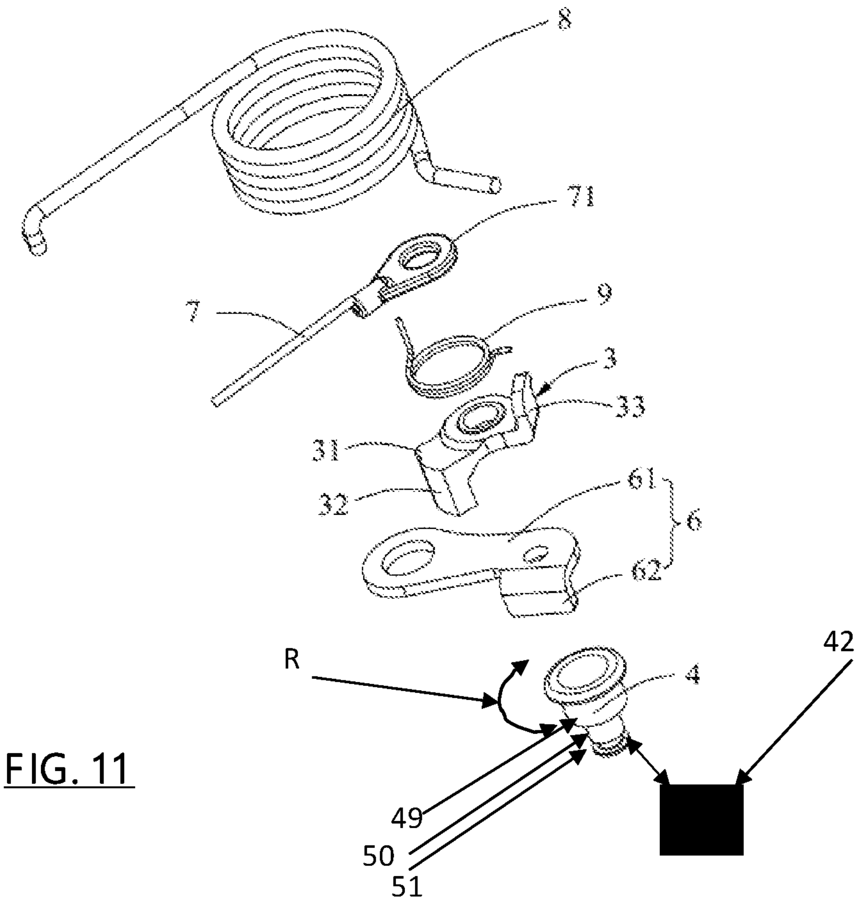
FIG. 11 is an exploded view showing the structure of the ratchet torsion spring and the pawl assembly according to an embodiment of the device of FIG. 1.

As shown in FIG. 9 to FIG. 11, the pawl 3 and the return member 9 are coaxially mounted on the rivet post 4, the pawl 3 has a hitching part 33, the return member 9 is sleeved on the rivet post 4, one end of the return member 9 is disposed to be fixed to the rivet post 4, and another end of the return member 9 abuts against the hitching part 33, so that the pawl 3 always has a tendency to rotate (be biased) in the forward direction.

The return member 9 in this embodiment can be a torsion spring, or a coil spring or other elastic parts, as long as the return member 9 can provide the restoring force for forward rotation of the pawl 3.

As shown in FIG. 11, the rivet post 4 has a stepped shaft structure, specifically including a first stepped shaft 49, a second stepped shaft 50 and a third stepped shaft 51 which are gradually reduced in shaft diameter and connected in sequence. An end of the pull cable 7 is fixedly mounted with a collar 71, and the collar 71 is sleeved on the first stepped shaft 49 of the rivet post 4, and one end of the ratchet torsion spring 8 is located below the first stepped shaft 49 and abuts on the first stepped shaft 49, so that the rivet post 4 can support the ratchet 5. The pawl 3 and the return member 9 are coaxially sleeved on the second stepped shaft 50.

Further as shown in FIG. 9 to FIG. 11, the pawl assembly further includes a spring-back member 6. The spring-back member 6 includes a connecting plate 61 and a supporting plate 62 which are connected to each other. One end of the connecting plate 61 is rotatably disposed on the base plate 1, another end of the connecting plate 61 is sleeved on the rivet post 4, and the supporting plate 62 is configured to support the ratchet 5.

Specifically, the connecting plate 61 and the supporting plate 62 can be formed integrally by bending, where the connecting plate 61 is gourd-shaped, one end of the connecting plate 61 is mounted coaxially with the ratchet 5 and the guide plate 2, and another end of the connecting plate 61 is sleeved on the third stepped shaft 51 of the rivet post 4, so that the pawl 3 can rotate coaxially with the ratchet 5 under the drive of the drive mechanism 42, 48. The supporting plate 62 is vertically connected to the connecting plate 61, and the supporting plate 62 can be attached to an outer edge of the ratchet 5, which facilitates the spring-back member 6 firmly supporting the ratchet 5.

Figure 12:
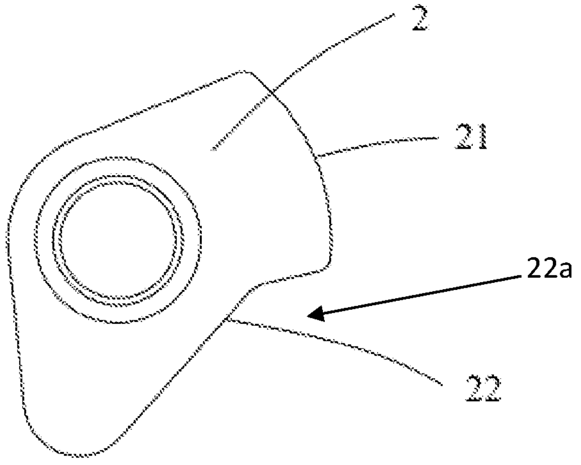
FIG. 12 is a schematic structure view of a guide plate according to an embodiment of the device of FIGS. 1 and 5.
Figure 13:
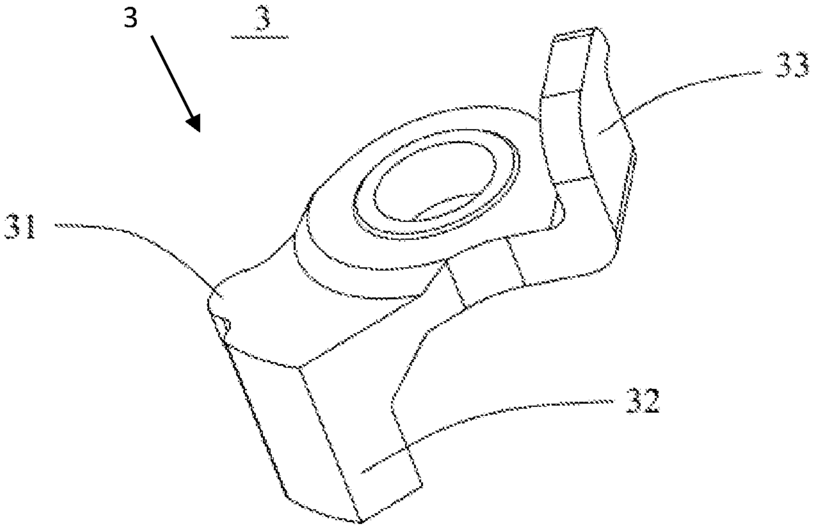
FIG. 13 is a schematic structure view of a pawl according to an embodiment of the device of FIGS. 1 and 5.

As shown in FIG. 12 and FIG. 13, the guide plate 2 has a first outer edge 21 and a second outer edge 22 which are connected to each other, and the second outer edge 22 is recessed inwardly to form an avoidance groove/region 22*a* (to inhibit interference between the pawl 3 and the guide plate 2 during rotation of the pawl 3) for making way for the pawl 3, so that after the pawl 3 reaches the half-locked position, the pawl 3 can rotate around the rivet post 4 in the forward direction under the action of the return member 9, so that the pawl 3 and the ratchet 5 are coupled together.

As shown in FIG. 13, the pawl 3 includes a body. An end of body vertically extends with an engaging part 32, one side, close to the guide plate 2, of the body has a flange 31, and the hitching part 33 is disposed vertically on the other side of the body. One end of the return member 9 is fixedly disposed on the rivet post 4, and the other end of the return member 9 is pressed against the hitching part 33 to facilitate the pawl 3 to have a tendency to rotate in the forward direction.

When the ratchet 5 is located between the unlocking position and the half-locked position, the flange (e.g. surface) 31 slidingly presses against the first outer edge 21 of the guide plate 2 to inhibit the forward rotation of the pawl 3 (e.g. due to the engagement of the components 2, 3 via the contact between the flange 31 and the edge 21).

Specifically, the ratchet 5 has a limiting slot 53. When the pawl 3 rotates around the rivet post 4 in the forward direction, the engaging part 32 comes into engagement with the limiting slot 53, or when the release member 10 rotates in the reverse direction, the pawl 3 rotates around the rivet post 4 in the forward direction, to facilitate the engaging part 32 to be disengaged from the limiting slot 53. When the pawl 3 reaches the half-locked position, due to the avoidance groove/region 22*a* of the guide plate 2, the pawl 3 is disengaged from the guide plate 2 (disengagement between the flange 31 and the edge 21), and rotates in the forward direction to be engaged with the limiting slot 53 by the engaging part 32 to realize the stable coupling/engagement between the ratchet 5 and the pawl 3. The release member 10 rotates in the reverse direction to drive the guide plate 2 to rotate in the forward direction. The first outer edge 21 of the guide plate 2 comes into engagement with the flange 31 of the pawl 3 and drives the pawl 3 to rotate in the reverse direction, so that the engaging part 32 is disengaged from the limiting slot 53, thereby realizing the unlocking of the lock device 10*a* and inhibiting the deadlock of the compartment cover 6*a*.

The lock device 10*a* can further include a first switch 70 disposed on the base plate 1, the ratchet 5 further includes a pressing part 52, and the first switch 53 is electrically connected to the drive mechanism 42, 48. When the ratchet 5 is in the unlocking position, the pressing part 52 presses against the first switch 70 so that the drive mechanism 42, 48 is turned off. When the ratchet 5 gets out of the unlocking position, the pressing part 52 is released from pressing against the first switch 70 to trigger the drive mechanism 42, 48.

Figure 14:
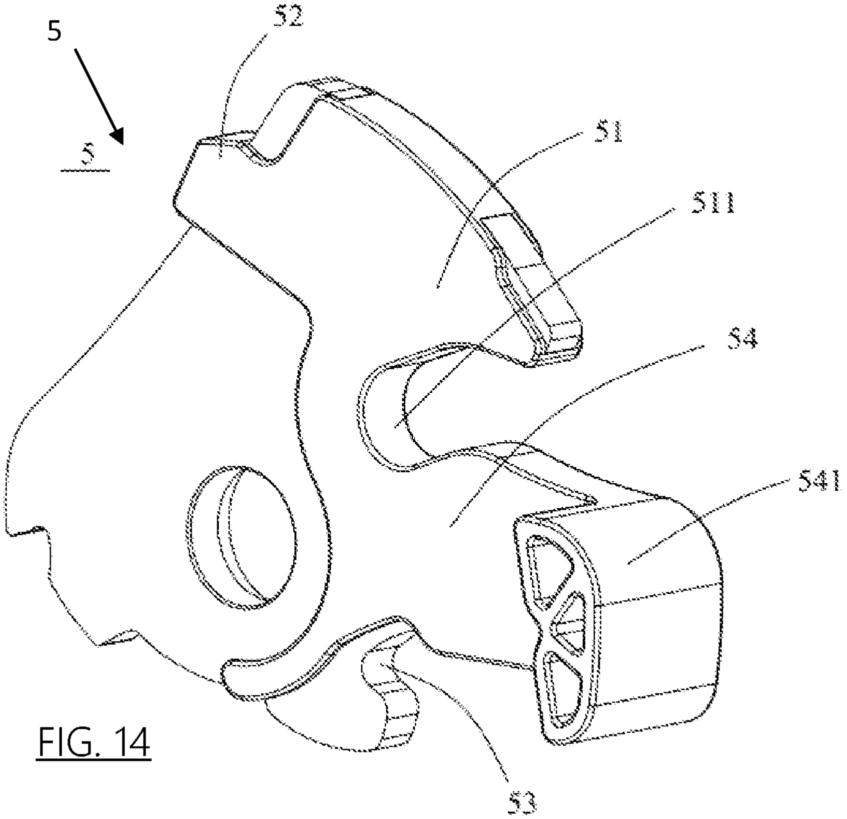
FIG. 14 is a schematic structure view of a ratchet according to an embodiment of the device of FIGS. 1 and 5.

As shown in FIG. 14, the ratchet 5 is of an irregular plate-like structure, roughly triangular. The outer edge of the ratchet 5 has the pressing part 52, a hook 51, the locking slot 511 and the limiting slot 53 in sequence in its circumferential direction. The pressing part 52 protrudes from the outer edge of the ratchet 5 so as to press against the first switch 70. The outer edge of the ratchet 5 is recessed inwardly to form a locking slot 511. The locking slot 511 divides a part of the ratchet 5 into the hook 51 and a connecting arm 54. A lower part of the outer edge of the connecting arm 54 is recessed inwardly to form the limiting slot 53 adapted to the engaging part 32 of the pawl 3, so as to facilitate coupling and connection between the ratchet 5 and the pawl 3.

It should be noted that a second switch 72 is further mounted on the baseplate 1, and the second switch 72, when triggered, can feed back a signal to a vehicle control unit (not shown), the signal reminding the driver, occupant or user that the compartment cover has been fully locked. When the ratchet 5 rotates to the full-locked position, the second switch 72 is triggered, and the vehicle control unit controls the motor (drive mechanism 42, 48) to turn off, so as to help keep the lock device 10*a* in a locked state.

The working process of the lock device 10*a* of this embodiment includes a locking process and an unlocking process. For facilitating the understanding, the specific locking process of the lock device 10*a* is as follows.

When the vehicle compartment cover 6*a* is opened, as shown in FIG. 1 and FIG. 2, the ratchet 5 and the pawl 3 are in the unlocking position, and the pressing part 52 of the ratchet 5 presses against the first switch 70, and the motor of the drive mechanism 42, 48 is in an off state. Under the action of the restoring force of the ratchet spring 8, the rivet post 4 supports the connecting arm 54 of the ratchet 5 through the spring-back member 6, and the latch 10 is located at a mouth position of the locking groove 511 and presses against an upper part of the connecting arm 54.

The motor 42, 48 is started by the vehicle control unit or the vehicle compartment cover 6*a* is slightly pressed so that the ratchet 5 rotates in the forward direction under the pressing force of the striker 100, and the pressing part 52 is released from the pressing against the first switch 70, thereby triggering the motor of the drive mechanism 42, 48. The motor pulls the rivet post 4 through the pull cable 7 to drive the pawl 3 to rotate in the forward direction relative to the base plate 1, so that the spring-back member 6 is out of contact with the connecting arm 54, the flange 31 of the pawl 3 is engaged with the first outer edge 21 of the guide plate 2, and the ratchet 5 rotates in the forward direction to the half-locked position under the pressing of the striker 100.

As shown in FIG. 3, when the pawl 3 and the ratchet 5 reach the half-locked position, due to the avoidance groove region 22*a* of the second outer edge 22 of the guide plate 2, the pawl 3 is disengaged from the guide plate 2 and rotates in the forward direction around the rivet post 4 to be engaged with the limiting groove 53 of the ratchet 5 by the engaging part 32 of the pawl 3. In this manner, the coupling/engagement between the ratchet 5 and the pawl 3 is facilitated. At this time, the drive mechanism 42, 48 continues to drive the pawl 3 to rotate in the forward direction, and the ratchet 5, driven by the pawl 3, rotates to the full-locked position. At the same time, the striker 100 slides into the locking groove 511, so that the striker 100 is locked and fitted with the locking groove 511 of the ratchet 5. The striker 100 drives the compartment cover 6*a* to close the engine compartment or luggage compartment 13*a* to complete the automatic locking of the lock device 10*a*.

It should be noted that when the ratchet 5 reaches the full-locked position, the second switch 72 can feed back a signal to the vehicle control unit to remind the driver and occupant or the user that the compartment cover 13*a* has been fully locked. At this time, the motor of the drive mechanism 42, 48 is turned off, and the lock device 10*a* remains in the closed state.

Referring to FIGS. 17-27, with reference to FIGS. 1-4, the lock device 10*a* in this embodiment includes a base plate 100*b*, a pawl 3, a pull-cable wheel unit 102*b*, a drive member 48 and a ratchet 5. The base plate 100 is fixedly mounted on a front cross beam 5*a* of the engine compartment 13*a* or luggage compartment 13*a*. The ratchet 5 and the pawl 3 are each rotatably disposed on the base plate 100, and the drive member 48 is drivingly connected to the pawl 3 through the pull-cable wheel unit 102*b*. The pawl 3 has an unlocking position, a half-locked position and a full-locked position. The drive member 48 is drivingly connected to the pawl 3, and pulls the pawl 3 to rotate through the pull cable 5*b*,6*b* on the pull-cable wheel unit 102*b*. The pawl 3 comes to be coupled with the ratchet 5 during rotation and rotates synchronously with the ratchet 5 to the full-locked position to lock the compartment cover 13*a*.

The drive member 48 can be a motor. When the compartment cover 13*a* is locked, an output shaft (not shown) of the motor is rotated in a reverse direction and reset, resulting in looseness of the pull cable 5*b*,6*b*. When the lock device 10*a* locks again, in an initial stage of starting of the motor, the output shaft rotates in a forward direction for a certain time to make the pull cable 5*b*,6*b* re-tensioned, and then pulls the pawl 3 to rotate again, which can increase time for locking of the lock device 10*a* and can reduce working efficiency of the lock device 10*a*.

In order to address the above issue, as shown in FIG. 17 to FIG. 20, a pull-cable wheel unit 102*b* is further disclosed in this embodiment. The pull-cable wheel unit 102*b* is mounted between the pawl 3 and the drive member 48 of the lock device 10*a*. Specifically, the pull-cable wheel unit 102*b* includes a positioning post 1*b*, a cable wheel 2*b*, a return wheel 3*b* and an elastic member 4*b*. The positioning post 1*b* is fixedly arranged on the base plate 100*b*, and the cable wheel 2*b* and the return wheel 3*b* are each rotatably sleeved on the positioning post 1*b*. The cable wheel 2*b* is wound with a first pull cable 5*b*, and the first pull cable 5*b* is connected to the pawl 3; the return wheel 3*b* is wound with a second pull cable 6*b*, and the second pull cable 6*b* is connected to an output end of the drive member 48. One end of the elastic member 4*b* abuts against the cable wheel 2*b*, and the other end of the elastic member 4*b* abuts against the return wheel 3*b*. When the lock device 10*a* is in the full-locked position, the elastic member 4*b* drives the return wheel 3*b* to rotate in the reverse direction by a preset angle, to allow part of the second pull cable 6*b* to be wound around the return wheel 3*b*.

In this embodiment, the forward direction is the direction indicated by arrows in FIG. 22 to FIG. 25 (i.e., a counter-clockwise direction), and the reverse direction is the direction indicated by arrows in FIG. 26 to FIG. 27 (i.e., a clockwise direction).

In this embodiment, the output shaft of the drive member 48 rotates in the forward direction to pull the second pull cable 6*b* on the return wheel 3*b*, and the cable wheel 2*b* and the return wheel 3*b* rotate in the forward direction to allow the lock device 10*a* to reach the full-locked position and be locked. Then, the output shaft of the drive member 48 is rotated in the reverse direction and reset, so that the second pull cable 6*b* is turned loose. Then, the return wheel 3*b* is rotated around the positioning post 1*b* in the reverse direction under a restoring force of the elastic member 4*b*, to allow part of the second pull cable 6*b* to be rewound on the return wheel 3*b* so as to maintain tension of the second pull cable 6*b*, so that the second pull cable 6*b* does not need to be re-tensioned when the lock device 10*a* locks again, which is conducive to reducing the time for locking of the lock device 10*a* and improving the locking efficiency.

Figure 17:
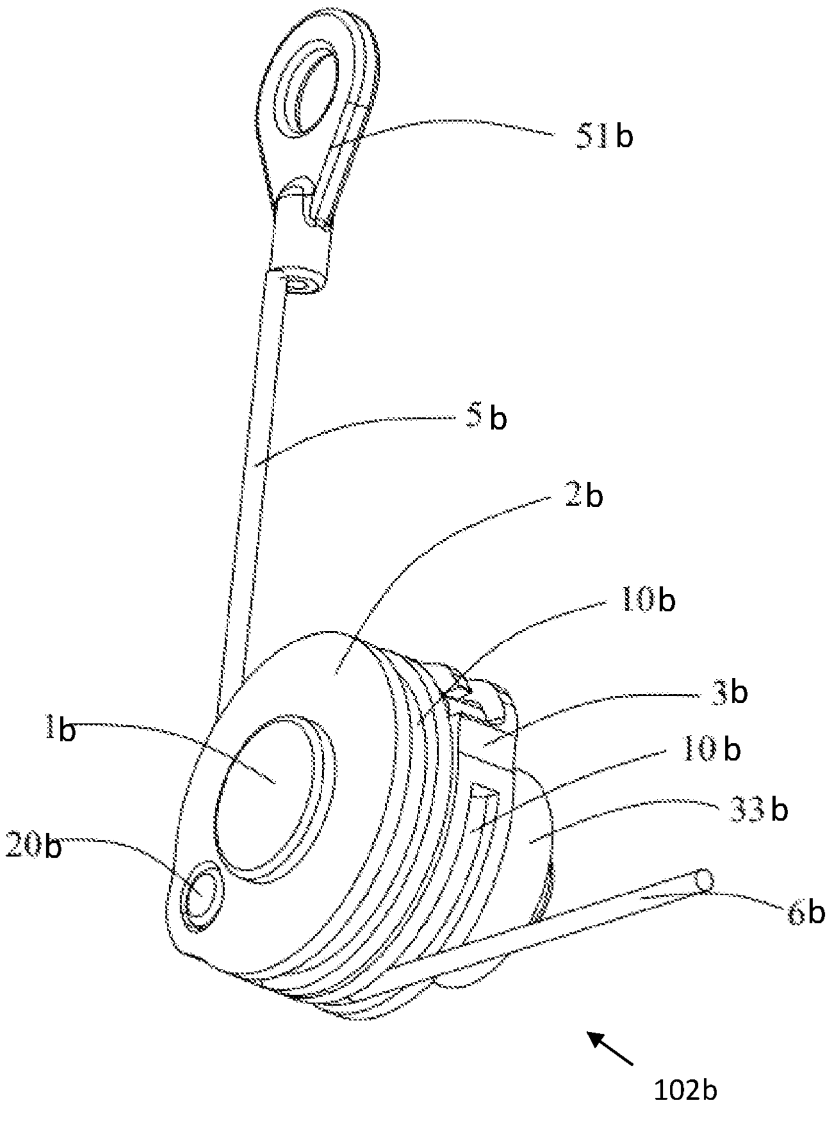
FIG. 17 is a schematic structure view of a pull-cable wheel unit for the vehicles of FIGS. 15 and 16.
Figure 18:
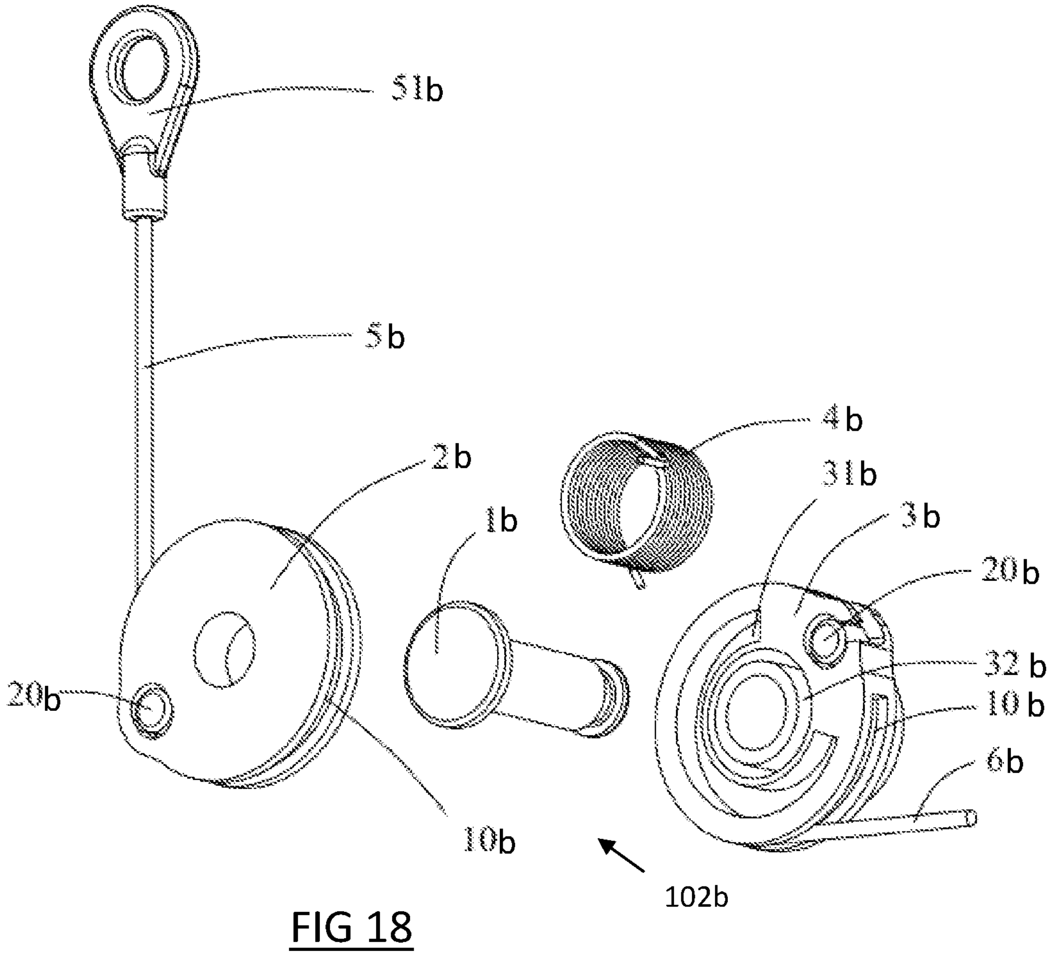
FIG. 18 is a schematic exploded view showing the structure of the pull-cable wheel unit of FIG. 17.

As shown in FIG. 17 and FIG. 18, the cable wheel 2*b* and the return wheel 3*b* are coaxially sleeved on the positioning post 1*b*, so that the cable wheel 2*b* and the return wheel 3*b* can rotate around the positioning post 1*b* under the action of the restoring force of the elastic member 4*b*. The elastic member 4*b* in this embodiment enables the return wheel 3*b* to have a tendency to rotate in the reverse direction, and enables the cable wheel 2*b* to always have a tendency to rotate in the forward direction.

It should be noted that the cable wheel 2*b* is rotatably disposed on the positioning post 1*b*. When the lock device 10*a* is in the full-locked position, the cable wheel 2*b* always keeps the tension state under the action of the restoring force of the elastic member 4*b*, and the return wheel 3*b* can rotate in the reverse direction to allow part of the second pull cable 6*b* to be rewound on the return wheel 3*b*. When the drive member 48 pulls the second pull cable 6*b*, the cable wheel 2*b* and the return wheel 3*b* rotate synchronously around the positioning post 1*b* in the forward direction to realize locking of the lock device 10*a*.

The elastic member 4*b* in this embodiment can be a torsion spring. In other alternative embodiments, the elastic member 4*b* may be an elastic element such as a coil spring as well.

As shown in FIG. 18, the return wheel 3*b* can be provided with an annular groove 32*b*, and the elastic member 4*b* is installed in the annular groove 32*b*. Specifically, an axial end surface of the return wheel 3*b* facing the cable wheel 2*b* can be provided with the annular groove 32*b*, most part of the elastic member 4*b* is located in the annular groove 32*b*, and one end of the elastic member 4*b* protrudes out of the annular groove 32*b* and abuts against the cable wheel 2*b*.

Preferably, the return wheel 3*b* has, in its axial direction, a first end facing the cable wheel 2*b* and a second end facing away from the cable wheel 2*b*, the second end is provided with a projection 33*b*, and the annular groove 32*b* extends from the first end of the return wheel 3*b* into the projection 33*b* to increase the depth of the annular groove 32*b*, thereby facilitating placement of the elastic member 4*b* having a longer axial length, and further improving the restoring force of the elastic member 4*b*.

One of the cable wheel 2*b* and the return wheel 3*b* can have a sliding groove 31*b* extending along a circumferential direction of the positioning post 1*b*, and the other of the cable wheel 2*b* and the return wheel 3*b* is provided with a sliding block 21*b* adapted to the sliding groove 31*b*. The sliding block 21*b* is slidably disposed in the sliding groove 31*b*. The sliding fit of the sliding block 21*b* in the sliding groove 31*b* can play a guiding role in the rotation of the cable wheel 2*b* and the return wheel 3, which can help to improve the connection strength and rotation stability of the cable wheel 2*b* and the return wheel 3*b*. In addition, an end of the elastic member 4*b* can abut against the sliding block 21*b*, so that there is no need to provide a mounting structure in the cable wheel 2*b*, which is conducive to simplifying the structure of the cable wheel 2*b*.

Figure 19:
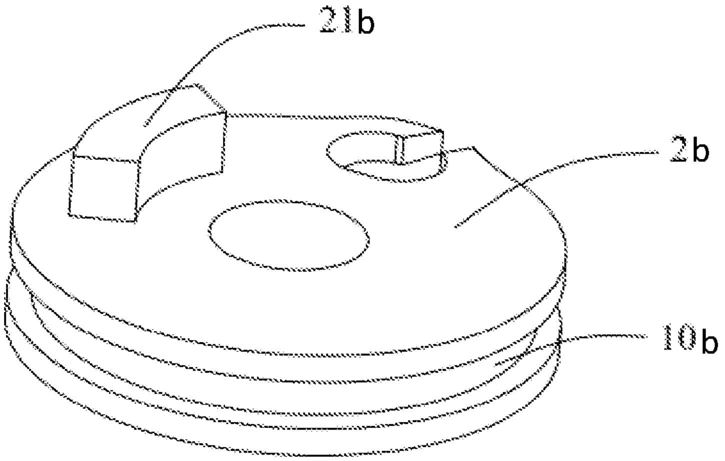
FIG. 19 is a schematic structure view of a cable wheel of FIG. 17.

As shown in FIG. 19, the axial end face of the cable wheel 2*b* facing the return wheel 3*b* is provided with the sliding block 21*b*, and the return wheel 3*b* is further provided with the sliding groove 31*b* in the end face where the annular groove 32*b* is provided. The sliding block 21*b* is an arc-shaped projection, and the sliding groove 31*b* is an arc-shaped groove. Specifically, taking the axial center of the positioning post 1*b* as the circle center, an obtuse angle between connecting lines of the circle center with outer edges of two ends of the sliding groove 31*b* is a central angle $\alpha$ of the sliding groove 31*b*, and $180° < \alpha < 360°$. For example, $\alpha$ may be 190°, 240°, 270°, 300° and 350°.

Further as shown in FIG. 18 and FIG. 19, a circumferential outer edge of each of the cable wheel 2*b* and the return wheel 3*b* is recessed inwardly to form a cable winding groove 10*b*, at least part of the first pull cable 5*b* is wound on the cable winding groove 10*b* of the cable wheel 2*b*, and at least part of the second pull cable 6*b* is wound on the cable winding groove 10*b* of the return wheel 3*b*. The first pull cable 5*b* and the second pull cable 6*b* can be wound on the corresponding cable winding grooves 10*b* to avoid slippage of the first pull cable 5*b* from the cable wheel 2*b* and slippage of the second pull cable 6*b* from the return wheel 3*b* respectively, which can be conducive to improving the stability and reliability of the pull-cable wheel unit 102*b*.

In this embodiment, from the unlocking position to the full-locked position, the cable wheel 2*b* rotates by a small angle and the length of the first pull cable 5*b* to be wound is also relatively small. Therefore, the circumferential outer edge of each of the cable wheel 2*b* and the return wheel 3*b* simply is provided with one cable winding groove 10*b*.

As shown in FIG. 17 to FIG. 20, the cable wheel 2*b* and the return wheel 3*b* are each provided with a lock post 20*b*, one end of the first pull cable 5*b* is fixedly connected to the lock post 20*b* of the cable wheel 2, the other end of the first pull cable 5*b* is connected to the pawl 3, one end of the second pull cable 6*b* is fixedly connected to the lock post 20*b* of the return wheel 3*b*, and the other end of the second pull cable 6*b* is connected to the output shaft of the drive member 48. The cable wheel 2*b* and the return wheel 3*b* are each provided with a mounting groove in communication with the respective cable winding groove 10*b*. The first pull cable 5*b* has one end fixedly connected to the lock post 20*b* of the cable wheel 2*b*, and taking the lock post 20*b* as a starting point for winding, part of the first pull cable 5*b* is wound on the cable wheel 2*b*. The second pull cable 6*b* has one end fixedly connected to the lock post 20*b* of the return wheel 3*b*, and taking the lock post 20*b* as a starting point for winding, part of the second pull cable 6*b* is wound on the return wheel 3*b*. The first pull cable 5*b* and the second pull cable 6*b* can be connected or fixed to the lock posts 20*b* by binding, pressing or the like.

Specifically, one end of the first pull cable 5*b* connected to the pawl 3 is provided with a collar 51*b*, and the collar 51*b* is connected to the pawl 3. The first pull cable 5*b* and the second pull cable 6*b* in this embodiment can be both steel wire ropes with good strength and rigidity. Moreover, the steel wire rope can be conductive to reducing the bending degree of each of the first pull cable 5*b* and the second pull cable 6*b* in the loose state, and avoiding interference with other structures of the lock device 10*a*.

For ease of understanding, the rotation process of the pull-cable wheel unit 102*b* in this embodiment is as follows.

Figure 20:
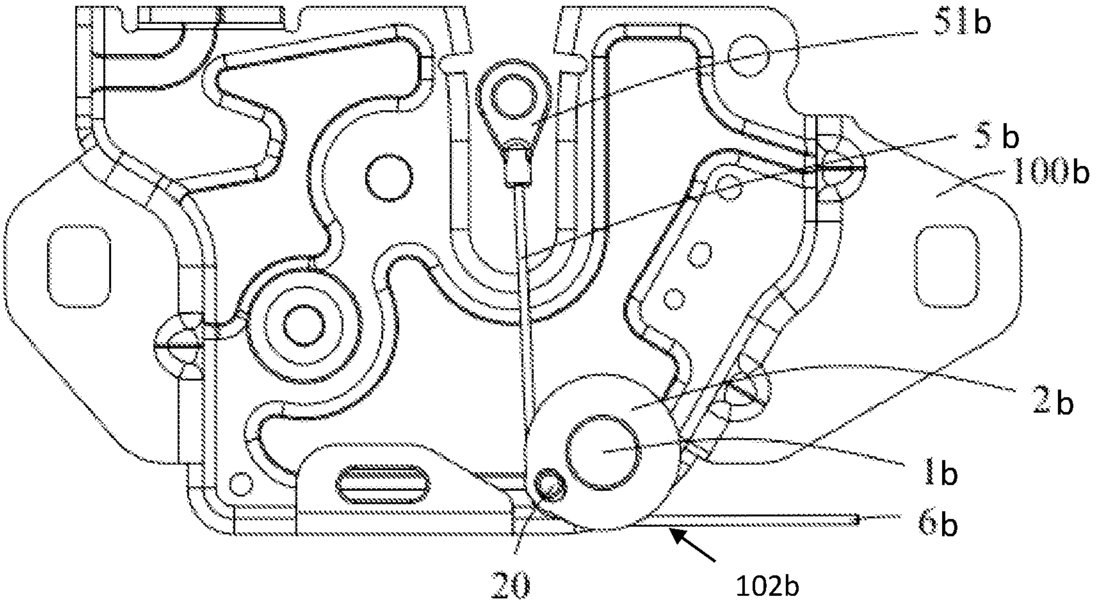
FIG. 20 is a schematic structure view of the pull-cable wheel unit and a base plate in a free state of FIG. 17.
Figure 21:
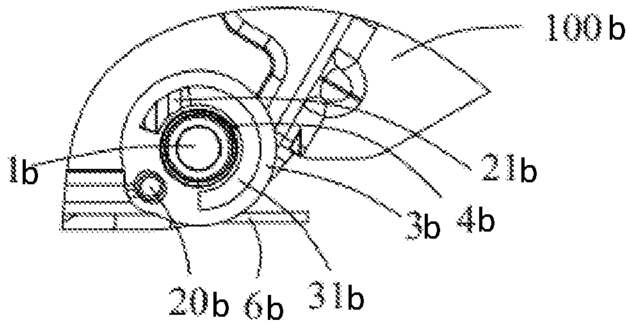
FIG. 21 is a partial sectional view of FIG. 20.

As shown in FIG. 20 and FIG. 21, with reference to FIG. 1, the lock device 10*a* is in the unlocking position, and the pull-cable wheel unit 102*b* is mounted on the base plate 100*b* and not connected to the pawl 3. The cable wheel 2*b* and the return wheel 3*b* are in a free state under the action of the elastic member 4*b*.

As shown in FIG. 22 and FIG. 23, the lock device 10*a* is in the unlocking position, the first pull cable 5*b* is almost entirely released from the cable wheel 2*b*, and connected to the pawl 3 through the collar 51*b*. Pulled by the drive member 48, the return wheel 3*b* rotates in the forward direction, and part of the second pull cable 6*b* is released from the cable winding groove 10*b* of the return wheel 3*b*, to allow the pull-cable wheel unit to be in a pre-tensioned state and be ready for locking of the lock device 10*a*.

Figure 24:
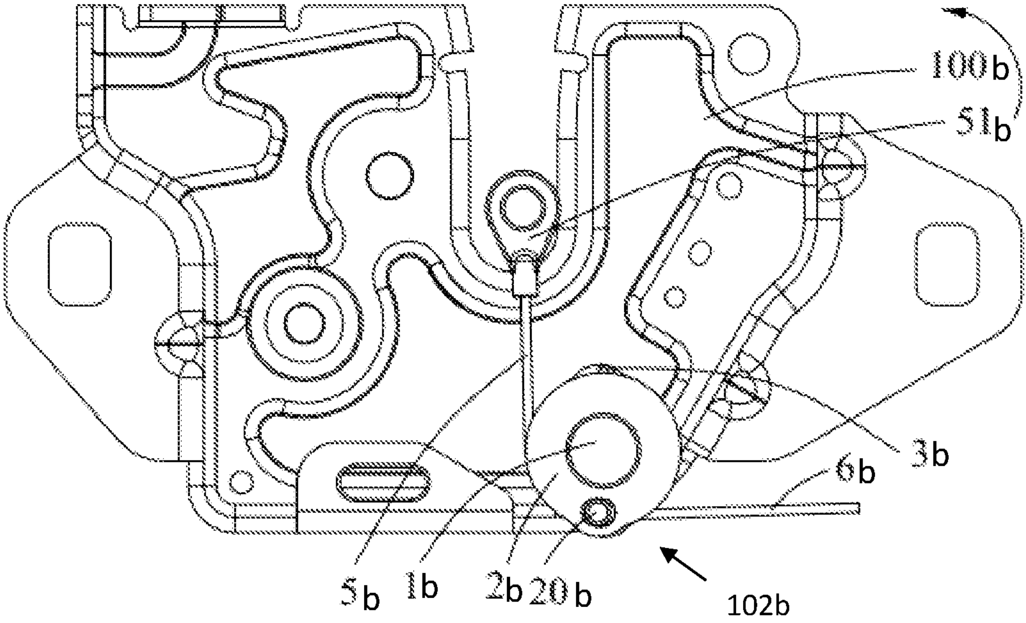
FIG. 24 is a schematic structure view of the pull-cable wheel unit and the base plate in a locked state of FIG. 17.
Figure 25:
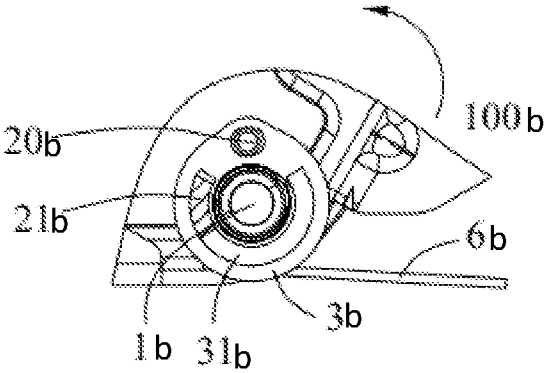
FIG. 25 is a partial sectional view of FIG. 24.

As shown in FIG. 24 and FIG. 25, driven by the drive member 48, the return wheel 3*b* continues to rotate in the forward direction, and part of the second pull cable 6*b* is released from the cable winding groove 10*b* of the return wheel 3*b*. The cable wheel 2*b* and the return wheel 3*b* rotate synchronously in the forward direction, and part of the first pull cable 5*b* is wound on the cable winding groove 10*b* of the cable wheel 2*b*, so that the first pull cable 5*b* pulls the pawl 3 to move from the unlocking position to the full-locked position to realize locking of the lock device 10*a*.

As shown in FIG. 26 and FIG. 27, when the lock device 10*a* is locked, the drive member 48 is turned off, the output shaft of the drive member 48 is rotated in the reverse direction and reset, and the second pull cable 6*b* is turned into the loose state. Since the collar 51*b* is stationary in the full-locked position, the first pull cable 5*b* and the cable wheel 2*b* are also kept stationary. Under the action of the restoring force of the elastic member 4*b*, the cable wheel 2*b* maintains the tensioning state, and the return wheel 3*b* rotates in the reverse direction by a preset angle, to allow part of the second pull cable 6*b* to be rewound on the cable winding groove 10*b* of the return wheel 3*b*, thereby realizing the tensioning of the second pull cable 6*b*, and inhibiting idling for a certain time of the drive member 48 when restarting to tension the loosen second pull cable 6*b*. This pull-cable wheel unit 102*b* can reduce the time for locking of the lock device 10*a* and improve the locking efficiency.

Only the basic principles and characteristics are described in the above embodiments, and is not limited to the above embodiments. Various modifications and changes may be made without departing from the spirit and scope of the present. These modifications and changes fall into the scope claimed to be protected. The scope to be protected is defined by the appended claims and equivalents thereof.

What is claimed is:

1. A lock device of a vehicle, the lock device comprising:
- a base plate;
- a guide plate rotatably disposed on the base plate;
- a pawl rotatably disposed on the base plate, the pawl being engageable with the guide plate in a pawl unlocking position and disengageable from the guide plate between a pawl half-locked position and a pawl fully-locked position;
- a ratchet rotatably disposed on the base plate for retaining a striker when the ratchet is in a ratchet half-locked position when the pawl is engaged with the ratchet in the pawl half-locked position, and when the ratchet is in a ratchet fully-locked position when the pawl is engaged with the ratchet in the pawl fully-locked position;
- a release member rotatably disposed on the base plate, the release member engageable with the guide plate, the release member is configured to drive the guide plate to engage with the pawl and drive the pawl to decouple from the ratchet;
- a return member and a rivet post, wherein the rivet post is rotatably disposed on the base plate, and the pawl is rotatably disposed on the rivet post through the return member;
- the ratchet comprising a locking slot for receiving the striker of a vehicle compartment cover, the ratchet having an unlocking position, the ratchet half-locked position, and the ratchet fully-locked position in a rotation sequence in a forward rotation direction, and when the ratchet is located in the unlocking position, the pawl is engaged with the guide plate, and the striker presses against the locking slot to facilitate the ratchet to be supported on the rivet post, and when the ratchet is located in the ratchet half-locked position, the pawl is disengaged from the guide plate and rotates around the rivet post in the forward rotation direction to facilitate the pawl and the ratchet to be coupled with each other and rotate synchronously to their respective fully-locked positions, thereby enabling the locking slot to be locked and fitted with the striker; and
- the release member configured to rotate in a reverse rotation direction after the pawl and the ratchet are coupled with each other and drive the guide plate to rotate in the forward rotation direction, so that the guide plate comes into engagement with the pawl and drives the pawl to rotate in the reverse rotation direction, enabling the pawl to be decoupled from the ratchet.

2. The lock device according to claim 1, wherein one of the release member and the guide plate is provided with an engaging slot, the other one of the release member and the guide plate is provided with a release column, and the engaging slot is engaged and fitted with the release column.

3. The lock device according to claim 1, wherein the release member is biased by a restoring member in relation to a positioning column, the positioning column is disposed on the base plate and both the release member and the restoring member are sleeved on the positioning column, one end of the restoring member is fixedly disposed, and another end of the restoring member abuts against the release member to facilitate the release member to have a tendency to rotate in the forward rotation direction.

4. The lock device according to claim 1, wherein the lock device further comprises a ratchet torsion spring, one end of the ratchet torsion spring is fixedly disposed on the base plate, and another end of the ratchet torsion spring is located under the rivet post and abuts against the rivet post to facilitate the ratchet to have a tendency to rotate in the reverse rotation direction.

5. The lock device according to claim 4, wherein the lock device further comprises a drive mechanism, the drive mechanism has an output end connected to the rivet post, and the drive mechanism is configured to be capable of driving the pawl to rotate from the unlocking position to the pawl fully-locked position through the rivet post when the drive mechanism is triggered.

6. The lock device according to claim 5, further comprising: a first switch disposed on the base plate, wherein the ratchet further comprises a pressing part, and the first switch is electrically connected to the drive mechanism; and when the ratchet is in its unlocking position, the pressing part presses against the first switch so that the drive mechanism is turned off; and when the ratchet comes out of its unlocking position, the pressing part is released from pressing against the first switch to trigger the drive mechanism.

7. The lock device according to claim 1, wherein the guide plate has a first outer edge, the pawl has a flange, and the flange is capable of slidably pressing against the first outer edge.

8. The lock device according to claim 7, wherein the guide plate further has a second outer edge connected to the first outer edge, and the second outer edge is recessed inwardly to form an avoidance groove for making way for the pawl.

9. The lock device according to claim 1, wherein the pawl has an engaging part, the ratchet has a limiting slot, and the pawl is configured to be capable of rotating around the rivet post in the forward rotation direction to facilitate the engaging part to be engaged with the limiting slot; or when the release member rotates in the reverse rotation direction, the pawl rotates around the rivet post in the forward rotation direction, to facilitate the engaging part to be disengaged from the limiting slot.

10. A lock device of a vehicle, the lock device comprising:

a base plate;

a guide plate rotatably disposed on the base plate;

a pawl rotatably disposed on the base plate, the pawl being engageable with the guide plate in an unlocking position and disengageable from the guide plate between a pawl half-locked position and a pawl fully-locked position;

a ratchet rotatably disposed on the base plate for retaining a striker when the ratchet is in a ratchet half-locked position when the pawl is engaged with the ratchet in the pawl half-locked position, and when the ratchet is in a ratchet fully-locked position when the pawl is engaged with the ratchet in the pawl fully-locked position;

a release member rotatably disposed on the base plate, the release member engagable with the guide plate, the release member configured to drive the guide plate to engage with the pawl and drive the pawl to decouple from the ratchet; and a rivet post rotatably disposed on the base plate, wherein the pawl is rotatably disposed on the rivet post, and wherein a pull cable is connected to the rivet post so that the pawl is configured to rotate with the ratchet when the pull cable is pulled.

11. The lock device of claim 10, further including a spring-back member rotatably disposed on the base plate, wherein the spring-back member is sleeved on the rivet post.

12. The lock device of claim 10, further including a ratchet torsion spring having one end of the ratchet torsion spring fixedly disposed on the base plate and another end of the ratchet torsion spring is configured to abut against the rivet post.

13. The lock device according to claim 10, wherein the pawl is rotatably disposed on the rivet post through a return member.

14. The lock device of claim 10, further including a spring-back member rotatably disposed on the base plate, wherein the spring-back member is sleeved on the rivet post;

a ratchet torsion spring having one end of the ratchet torsion spring fixedly disposed on the base plate and another end of the ratchet torsion spring is configured to abut against the rivet post; and wherein the pawl is rotatably disposed on the rivet post through a return member.

15. The lock device of claim 10, wherein the pull cable comprises a collar sleeved on the rivet post.

16. The lock device according to claim 10, wherein the ratchet comprises a locking slot for receiving the striker of a vehicle compartment cover, the ratchet having an unlocking position, the ratchet half-locked position, and the ratchet fully-locked position in a rotation sequence in a forward rotation direction, and when the ratchet is located in the unlocking position, the pawl is engaged with the guide plate, and the striker presses against the locking slot to facilitate the ratchet to be supported on the rivet post, and when the ratchet is located in the ratchet half-locked position, the pawl is disengaged from the guide plate and rotates around the rivet post in the forward rotation direction to facilitate the pawl and the ratchet to be coupled with each other and rotate synchronously to their respective fully-locked positions, thereby enabling the locking slot to be locked and fitted with the striker; and the release member configured to rotate after the pawl and the ratchet are coupled with each other and drive the guide plate to rotate so that the guide plate comes into engagement with the pawl and drives the pawl to rotate, enabling the pawl to be decoupled from the ratchet.

* * * * *